United States Patent
Griggs et al.

(10) Patent No.: US 11,216,773 B1
(45) Date of Patent: Jan. 4, 2022

(54) RESOURCE EFFICIENT INTERACTIONS WITH DATA CORRESPONDING TO PHYSICAL PARCEL

(71) Applicant: Postal Partners, LLC, Louisville, KY (US)

(72) Inventors: Stacy B. Griggs, Shelbyville, KY (US); Richard M. Teachout, III, Louisville, KY (US); Christopher W. Porter, Jeffersontown, KY (US); T. Calvin Wells, Jr., Madison, MS (US)

(73) Assignee: POSTAL PARTNERS, LLC, Louisville, KY (US)

( * ) Notice: Subject to any disclaimer, the term of this patent is extended or adjusted under 35 U.S.C. 154(b) by 0 days.

(21) Appl. No.: 17/334,064

(22) Filed: May 28, 2021

Related U.S. Application Data

(60) Provisional application No. 63/180,440, filed on Apr. 27, 2021.

(51) Int. Cl.
  *G06Q 10/08* (2012.01)
  *G06K 7/14* (2006.01)
  *G06F 16/23* (2019.01)

(52) U.S. Cl.
  CPC ..... *G06Q 10/0833* (2013.01); *G06F 16/2379* (2019.01); *G06K 7/1443* (2013.01)

(58) Field of Classification Search
  CPC .............. G06Q 10/0833; G06K 7/1443; G06F 16/2379
  See application file for complete search history.

(56) References Cited

U.S. PATENT DOCUMENTS

| | | | |
|---|---|---|---|
| 9,515,984 B1 | 12/2016 | Griggs et al. | |
| 9,742,727 B1 | 8/2017 | Griggs et al. | |
| 10,204,339 B2 | 2/2019 | Madisetti et al. | |
| 10,402,792 B2 | 3/2019 | Lin et al. | |
| 10,263,949 B1 | 4/2019 | Griggs et al. | |
| 10,834,048 B1 | 11/2020 | Griggs et al. | |
| 2012/0011068 A1 | 1/2012 | Dearing et al. | |
| 2019/0322426 A1* | 10/2019 | Verma | H04L 9/3239 |
| 2019/0354931 A1 | 11/2019 | Amato | |

\* cited by examiner

*Primary Examiner* — Matthew Mikels
(74) *Attorney, Agent, or Firm* — Middleton Reutlinger

(57) ABSTRACT

Implementations relate to various techniques for resource efficient interactions with data corresponding to a physical parcel (already created or yet to be created) that is to be delivered to a recipient by a courier entity. Some of those implementations relate to techniques to enable access, by the recipient, of interior content data of the physical parcel. Some additional or alternative implementations relate to techniques to enable resource efficient storage and/or access to data related to a physical parcel, while enabling interaction(s) with the physical parcel by various disparate entities to be tracked and while maintaining appropriate access control to such data.

19 Claims, 14 Drawing Sheets

4512 Buck Avenue Delivery Summary

— 1292A1

ACME ELECTRIC
123 MAIN ST.
LOUISVILLE, KY
40223

$0.45
ABC COURIER
PRIORITY
MAY 1 2021

JOHN DOE
4512 BUCK AVE.   ACC0123412789-55
LOUISVILLE, KY
40202

- Received by ABC Courier on 5/1/21 @ 4:45 EDT — 1292A2
- Scheduled for delivery by ABC Courier on 5/4/21

— 1292A3

View Interior Contents

— 1292A4

View Extra Content Related to Interior Contents

•
•
•

1200B

*4512 Buck Avenue – Parcel Details* — 1292B1

ACME ELECTRIC
123 MAIN ST.
LOUISVILLE, KY
40223

$0.45
ABC COURIER
PRIORITY
MAY 1 2021

JOHN DOE
4512 BUCK AVE.
LOUISVILLE, KY
40202

ACC0123412789-55

Reproduction of Interior Contents

— 1292B2

— 1292B3

Pay Bill Online

— 1292B4

Forgo Delivery

RESOURCE EFFICIENT INTERACTIONS WITH DATA CORRESPONDING TO PHYSICAL PARCEL

BACKGROUND

Various courier entities (e.g., the United States Postal Service (USPS), United Parcel Service (UPS), Fedex) deliver millions of parcels daily to various commercial and home addresses. Such parcels include, for example: postcards; envelopes enclosing paper and/or other contents; boxes enclosing goods, paper (e.g., receipt(s), instruction manual(s)), and/or other contents; and/or irregular shaped containers (e.g., soft shell container(s)) enclosing goods, paper and/or other contents.

Some courier entities do provide tracking and/or informed delivery services for at least some parcels. For example, some courier entities enable tracking of the status of a parcel utilizing a unique tracking number that is affixed to and/or printed on the parcel. The status of a parcel can be ascertained through interacting with a website and/or application programming interface (API) that is maintained by the courier entity. However, such tracking requires assignment and management of the tracking numbers by the courier entity and, further, the courier entity maintains sole control over the various backend systems necessary to facilitate such tracking.

The USPS offers Informed Delivery that enables a recipient to digitally preview USPS physical mail that is slated for delivery to the recipient. However, the digital preview for physical mail is only available on the day that it is slated for delivery and it requires the physical mail to be created and physically received and processed by the USPS. Further, the digital preview is restricted to exterior images of the physical mail and, optionally, to certain digital content corresponding to the physical mail. However, the digital content is only provided for large scale campaigns and the same digital content is provided for each of a large quantity of physical mail of each going to different recipients. Put another way, the digital content is not personalized per physical mail piece but, rather, is the same across a large quantity of mail pieces. Further, the digital content must be provided to USPS managed systems by a sending entity, is provided to recipients by USPS managed systems, and is only shown for physical mail that includes, on an exterior, a Mailer ID that corresponds to the digital content and that is assigned by USPS managed systems. Yet further, the digital content is only provided to a recipient on the day that the corresponding physical parcel is slated for delivery to the recipient.

SUMMARY

Implementations disclosed herein relate to various techniques for resource efficient interactions with data corresponding to a physical parcel (already created or yet to be created) that is to be delivered to a recipient by a courier entity.

Some of those implementations relate to techniques to enable access, by the recipient, of interior content data of the physical parcel. In some versions of those implementations, the interior content data of the physical parcel is transmitted, by a sending entity, to an intermediary system and the intermediary system stores the interior content data with access restriction data that enables access by the recipient (and optionally the sending entity) and/or that prevents access by the courier entity and/or any other parties. For example, the access restriction data can include data that restricts access of the interior content data to only a verified account of the recipient and, optionally, a verified account of the sender. In these and other manners, security of the interior content data is maintained, enabling access to the recipient while preventing access by the courier entity and/or other unauthorized entities.

In some additional and/or alternative versions of those implementations, the sending entity can transmit the interior content data prior to the corresponding physical parcel being received by the courier entity, prior to the physical parcel being ready for delivery by the courier entity, or even prior to generating of the physical parcel by the sending entity. Moreover, the intermediary system can make the interior content data, received in a transmission, accessible to the recipient prior to the corresponding physical parcel being received by the courier entity, prior to the physical parcel being ready for delivery by the courier entity, or even prior to generating of the physical parcel by the sending entity. In these and other manners, the intermediary system can make the interior content data digitally accessible to the recipient with reduced latency.

Further, in some of those additional or alternative versions, the intermediary system can store certain interaction data in response to a recipient viewing the interior content data and/or in response to the recipient providing user interface input(s) to confirm foregoing and/or delaying delivery of the physical parcel. The certain interaction data can be accessed by the sending entity and/or the courier entity and, in response, the sending entity and/or the courier entity can adapt processing related to the parcel. For example, the sending entity can determine to forego actual generation of the physical parcel and/or to delay provisioning of the physical parcel to the courier entity for delivery. Foregoing generation of the physical parcel conserves use of material and power resources that would otherwise be utilized in generating the physical parcel. Delaying provisioning of the physical parcel to the courier entity can enable the sending entity to more efficiently utilize logistical resources in providing the physical parcel to the courier entity. For instance, the physical parcel can be included in a later non-full delivery to the courier as opposed to necessitating a more immediate additional delivery to the courier. As another example, the courier entity can forgo delivery of the physical parcel to the recipient and/or delay delivery of the physical parcel to the recipient. For instance, a mail sorting system of the courier entity can be instructed to route the physical parcel for recycling in lieu of delivery, thereby lightening the load of delivery vehicles and/or enabling delivery vehicles to forego stops that would have otherwise been needed. Also for instance, the courier entity can delay delivery of the physical parcel to the recipient, enabling the courier entity to more efficiently utilize logistical resources (e.g., delay delivery by a day to make delivery routes more efficient).

The interior content data that is accessible to the recipient is generated, by the sending entity, based on interior contents, of the physical parcel, that are not externally visible on the physical parcel. The sending entity can be computer system(s) that are controlled by a person or corporate entity that is managing virtual and/or physical provision of the physical parcel to a courier entity, or controlled by an automated mail corporate entity that is managing the provision of the physical parcel to the courier entity and that is operating in accordance with instructions provided by another entity.

The interior content data can include reproduction data and/or metadata. Reproduction data reflects at least part of the actual interior contents and can include, for example: an image of the at least part of the interior contents; a portable document format (PDF) version of the at least part of the interior contents; a structured representation of the at least part of the interior contents, that is optionally formatted differently than the at least part of the interior contents (e.g., an HTML or XML document having content that "matches" a letter of the interior contents, but that is formatted differently). Reproduction data can additionally or alternatively include metadata that is generated based on the interior contents, but that does not directly reflect the actual interior contents (e.g., the metadata has no true counterpart in the actual interior contents). For example, the metadata can include a hyperlink (optionally personalized to the recipient) that is not included in the interior contents but that, when selected, causes navigation to a web page or document that includes further details on the interior contents and/or enables paying of an invoice related to the interior contents. As another example, the metadata can include an instruction manual to goods included in the interior contents, or a link to the instruction manual, and the interior contents can lack the instruction manual.

Some additional or alternative implementations relate to techniques to enable resource efficient storage and/or access to data related to a physical parcel, while enabling interaction(s) with the physical parcel by various disparate entities to be tracked and while maintaining appropriate access control to such data. Some of those implementations generate and/or utilize recipient information (RI) that uniquely identifies the recipient of the physical parcel and/or a unique parcel identifier (UPI) that uniquely identifies the parcel. The RI can be generated as a function of a recipient address for the physical parcel and the UPI can be generated as a function of exterior feature(s) that will be externally visible on the exterior of the generated physical parcel. For example, the RI can be generated by applying some or all of recipient address data to a recipient hash function and the UPI can be generated by applying some or all of the exterior features to a parcel hash function. The exterior feature(s) can include, for example, a return address, a recipient address, 1D and/or 2D barcode(s) (e.g., sender specified barcode(s), courier-specified intelligent mail barcode, courier-specified postage 2D barcode, and/or other barcode(s)), a postal identification ID, postage (e.g., a non-unique affixed or printed stamp or a unique affixed or printed stamp), a sender specified ID, a date of mailing, a time of mailing, and/or other feature(s).

In implementations that generate and/or utilize RI and/or a UPI for a physical parcel, the RI and/or the UPI can be utilized in storing interior content data related to the physical parcel and/or in storing other data related to the parcel. Such other data can include, for example, smart contract(s) related to the parcel, indication(s) of whether the interior content data of the parcel has been viewed by a recipient, status information from the courier entity that indicates a status of the physical parcel, sender exterior image(s) of an exterior of the physical parcel, courier exterior image(s) of the exterior, and/or other data. Utilizing the RI and/or the UPI enables fast and efficient writing and/or identification and retrieval of the data.

Additionally, the RI and/or the UPI can be generated such that they are robust to different images of the same physical parcel. For example, the UPI can be generated as a function of text and/or other content that is derived from processing of an image instead of being generated directly as a function of pixels of the image. This enables the same UPI to be generated based on two different images of a parcel (e.g., a sender image and a courier image), despite the two different images being taken with different cameras, in different lighting conditions, and even with the parcel being in different states (e.g., slight deformations to the parcel in the later image as a result of handling). In these and other manners, occurrences of multiple UPIs being generated for the same physical parcel is mitigated, thereby mitigating occurrences of data inadvertently not being assigned to the correct parcel. As yet another example, the UPI can optionally be generated as a function of only feature(s) that are applied by and/or fully directed by a sending entity, enabling the UPI to be generated in advance of any courier directed feature(s) being applied to the physical parcel. This can enable the sending entity to transmit interior content data and/or other data at an early stage (e.g., before generating the physical parcel and/or affixing (or printing) courier postage to the physical parcel), and the interior content data and/or other data to be assigned to a fixed UPI for the physical parcel at the early stage.

In some implementations that generate and/or utilize the RI and/or the UPI, the RI and/or the UPI are utilized in immutably storing the data in block(s) of a blockchain. Some versions of those implementations store the UPI of a physical parcel as part of any block that contains data related to the physical parcel. For instance, a block that contains the interior content data of the physical parcel can also include the UPI (e.g., in a header and/or elsewhere), a separate block that indicates the interior content data was accessed by a recipient can also include the UPI, a separate block that includes an exterior image of the physical parcel can also include the UPI, etc. This enables data related to the physical parcel to be efficiently identified in the blockchain, while the blockchain prevents alteration of stored data by any entity.

In some of those versions, a parent blockchain is maintained that includes a recipient node for every validated RI. As described herein, some recipient nodes can be for a group of validated RIs of a household, business, or other entity. Recipient information can be validated, for example, by a courier entity and/or through interaction(s) with the corresponding recipient. For example, the validating interaction(s) for a recipient can include having the recipient digitally enter a code that has been physically delivered to a corresponding recipient address, verifying an IP address used by a client device alleged to belong to the recipient actually corresponds to the recipient address, and/or other interaction(s).

The parent blockchain can be searched to determine whether any recipient node matches a generated RI for a physical parcel of a request. If not, a notification can be provided, in response to the request, informing the requesting entity that the recipient address for the physical parcel is flawed. If so, the matching recipient node can be used to identify a particular recipient child blockchain that is linked to (e.g., associated with the same RI(s)) the recipient node of the parent blockchain. The child blockchain can be specific to only the recipient and can include entries related to all physical parcels addressed to the recipient and processed according to techniques disclosed herein. Further, a new block of data that is based on the request can be caused to be added to the child blockchain. For example, a request can be submitted to a blockchain cross chain bridge (optionally after verification by the parent blockchain), where the request identifies the child blockchain (e.g., by RI), identifies the UPI, and includes other data of the request. The new block of data can include the UPI of the physical parcel (which can be included in or derived from the request), can include other data of the request (e.g., interior content data, interaction data, or status data), and can include access restriction data that dictates which entity or entities can access the new block of data. The new block of data can be added as a child block of the child blockchain, optionally in a branch that is devoted to only the UPI.

The intermediary entity or other entity that maintains the parent blockchain and/or the child blockchain can, in processing a request to write data to a blockchain, first verify that the request is from an authenticated entity and that the authenticated entity has permissions to write the data. For example, a request to store interior content data in association with a UPI must be authenticated as originating from a verified sending entity before being acted upon. Various authentication procedures can be utilized such as digital tokens and/or digital certificates. Further, verification of a sending entity can be performed by the courier entity and relayed to the intermediary entity and/or can be performed by the intermediary entity directly.

Likewise, the intermediary entity or other entity that maintains the parent blockchain and/or the child blockchain can, in processing a request to read data from a blockchain, first verify that the request is from an authenticated entity and that the authenticated entity has permissions to read the data. For example, a request from a courier entity to read data from a block containing interior contents data would be denied when the access restriction data of that block does not grant the courier entity access. By having the intermediary entity manage the blockchain and/or manage access to block(s) of the blockchain (e.g., managing which entities can access the blockchain at all, which can read certain blocks, and/or which can write to certain child blockchains), the need for encrypting data that is stored in blocks of the blockchain can be obviated. This can be beneficial as the encryption of the stored data can be computationally burdensome. Further, encryption often utilizes a public and private key. This can be problematic when multiple parties are attempting to access the same block of data as it would require sharing of private keys (which raises security concerns) and/or would require the computationally burdensome duplicating of data blocks (with each including encrypted data encrypted based on a corresponding private key). Moreover, if the private key of a party (e.g., sending entity, courier entity, or recipient entity) was lost it could fully prevent access by that party to corresponding blocks and if it was stolen it could enable nefarious access by other unauthorized parties. These concerns are obviated by having the intermediary entity manage the blockchain as that entity can independently verify parties, temporarily suspend access to a party, and/or re-authorize access to a party—while ensuring continued access to immutable blockchain data and also ensuring data security.

The above is provided merely as an overview of some implementations. Those and/or other implementations are disclosed in more detail herein.

DETAILED DESCRIPTION

Figure 1:
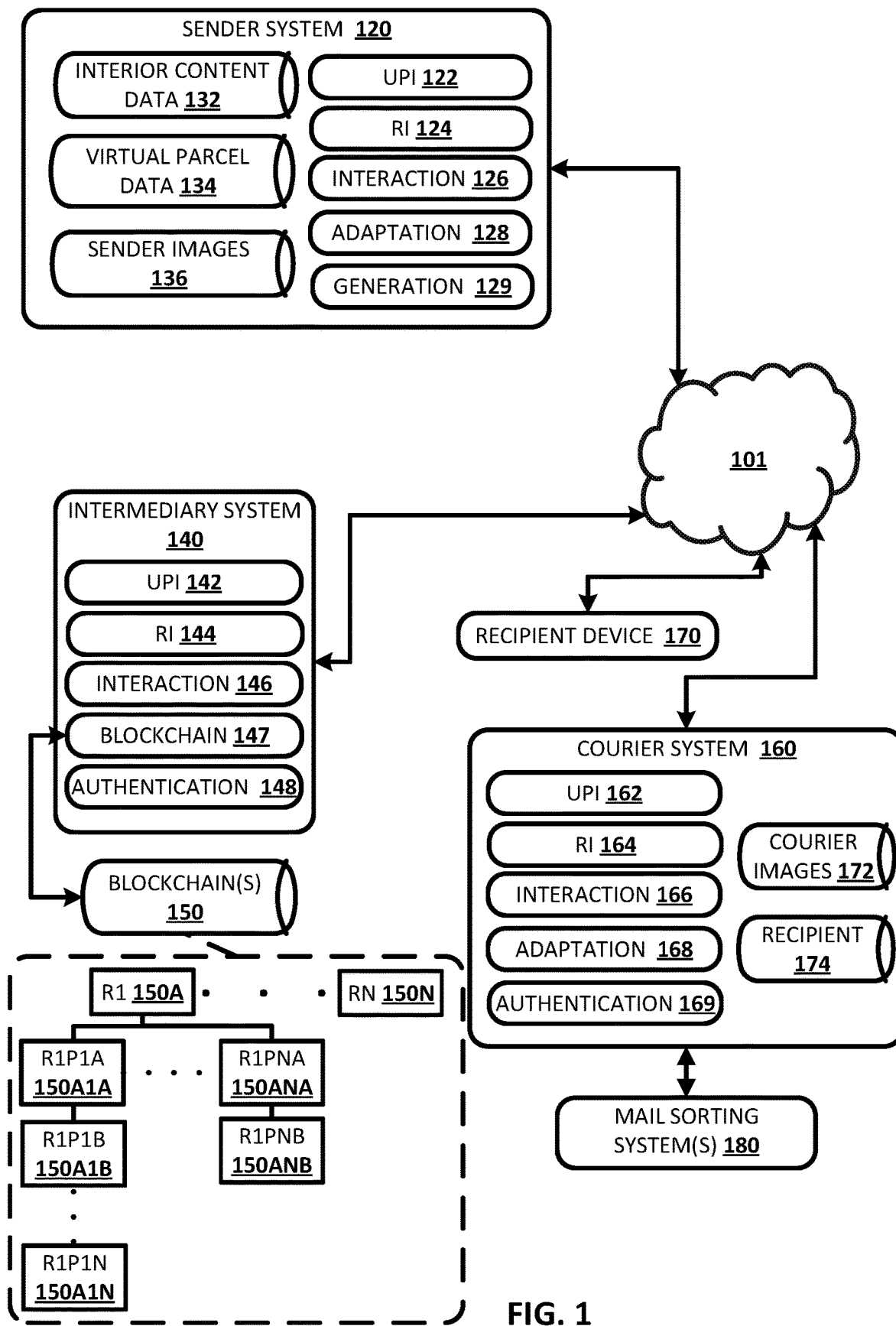
FIG. 1 is a block diagram of an example environment in which implementations disclosed herein may be implemented.

Turning initially to FIG. 1, an example environment is illustrated in which various implementations can be performed. FIG. 1 includes a sender system 120 (also referred to herein as sender entity), an intermediary system 140 (also referred to herein as intermediary entity), a courier system 160 (also referred to herein as courier entity), a recipient device 170, and blockchain(s) 150.

Although only a single sender system 120 is illustrated in FIG. 1, it is understood that in various implementations a large quantity (e.g., hundreds or thousands) of separate sender systems that are each controlled by a separate sending entity can be provided, and can each interact with intermediary system 140 and/or blockchain(s) 150 to cause certain data to be created for parcel(s) provided for virtual or physical delivery by the sender system and/or to access certain data related to such parcel(s). Further, although only a single recipient device 170 is illustrated in FIG. 1, it is understood that a large quantity (e.g., thousands or millions) of recipient devices can be provided, and can each interact with intermediary system 140 and/or blockchain(s) 150 to access certain data related to parcels provided for virtual and/or physical delivery to a corresponding recipient and/or to cause creation of certain data related to such parcels. Yet further, although only a single courier system 160 is illustrated in FIG. 1, it is understood that additional (e.g., tens or hundreds) courier systems that are each controlled by a separate courier entity can be provided, and can each interact with intermediary system 140 and/or blockchain(s) 150 to cause certain data to be created for parcel(s) processed by the courier system and/or to access certain data related to such parcel(s). In other implementations, intermediary system 140 can be configured to interact with only a single courier entity.

The sender system 120 can be implemented by one or more client devices and/or one or more servers (e.g., a cluster of cloud-based servers). The sender system 120 is illustrated as including a uniform parcel identifier (UPI) engine 122, a recipient information (RI) engine 124, an interaction engine 126, and an adaptation engine 128. One or more of the engines 122, 124, 126, and/or 128 can be omitted in various implementations. For example, UPI engine 122 and RI engine 124 can be omitted in various implementations.

The sender system 120 also includes interior content data 132, virtual parcel data 134, and sender images 136. Sender images 136 can include, for each of a plurality of already generated physical parcels, image(s) of an exterior of the physical parcel. An already generated physical parcel is one that has been created by affixing and/or printing, to an exterior of the physical parcel, one or more (but not necessarily all) features that are desired or necessary for delivery of the physical parcel. Such features can include a return address, a recipient address, 1D and/or 2D barcode(s) (e.g., sender specified barcode(s), courier-specified intelligent mail barcode, courier-specified postage 2D barcode, and/or other barcode(s)), a postal identification ID, postage (e.g., a non-unique affixed or printed stamp or a unique affixed or printed stamp), a sender specified ID, a date of mailing, a time of mailing, and/or other feature(s). The sender images 136 can be captured, for example, by high-speed camera(s) (or other image capture device(s)) of a mailing system that is incorporated as part of, or interfaces with, the sender system 120.

The virtual parcel data 134 can define some or all of the exterior features that will be externally visible on the generated physical parcel. The virtual parcel data 134 can include structured data that defines some or all of the features that will be utilized (e.g., by a mail generation system) to generate the physical parcel. The virtual parcel data 134 can also include virtual images that reflect external feature(s) of the yet to be generated physical parcel and/or other data of the virtual parcel data 134 can be used to synthetically generate such virtual images. For example, a synthetically generated virtual image for a yet to be generated physical parcel can include a return address, a recipient address, barcode(s), a postal identification ID, a sender specified ID, a date of mailing, a time of mailing, and/or other feature(s) that will be included on the yet to be generated physical parcel—optionally positioned as they will be on the yet to be generated physical parcel.

The interior content data 132 can include, for each of a plurality of parcels, corresponding interior content data. Such interior content data can include reproduction data and/or metadata as described herein. The reproduction data, when included, can be based on an actual scan or image of the physical interior contents counterpart or, alternatively, can be a digital original (i.e., any physical interior contents will be printed based on the digital original). The interior content data 132 can be linked with corresponding virtual parcel data 134 and/or sender images 136 by virtue of being stored in a common entry and/or by virtue a universal parcel identifier (UPI) described herein and/or a sender specific identifier. For example, a sender image of a particular physical parcel can be stored in association with a particular UPI and/or particular sender specific identifier, and the interior content data for that physical parcel can be stored in association with the same particular UPI and/or particular sender specific identifier. Although interior content data 132, virtual parcel data 134, and sender images 136 are illustrated in FIG. 1 as separate databases, in various implementations they may be stored together in the same database(s). For example, an entry in a database can include a sender image for a particular physical parcel, virtual parcel data for the particular physical parcel, and interior content data for the particular physical parcel.

The UPI engine 122, when provided, can generate a UPI for a physical parcel based on content and/or position(s) of one or more exterior features that are externally visible on a generated physical parcel (or that will be externally visible on a yet to be generated physical parcel). For example, the UPI engine 122 can generate the UPI as a function of content and/or position(s) of one or more of: a recipient address, a return address, a barcode, an image scan, a postal identification ID, a mailing date, a mailing time, and/or other externally visible feature(s). The exterior feature(s) of an already generated physical parcel can be determined based on sender images 136, for an exterior of a generated physical parcel, that are, for example, captured by a high-speed camera of a mailing system. The exterior feature(s) of a yet to be generated physical parcel can be determined based on virtual parcel data for the physical parcel, from virtual parcel data 134.

Figure 2:
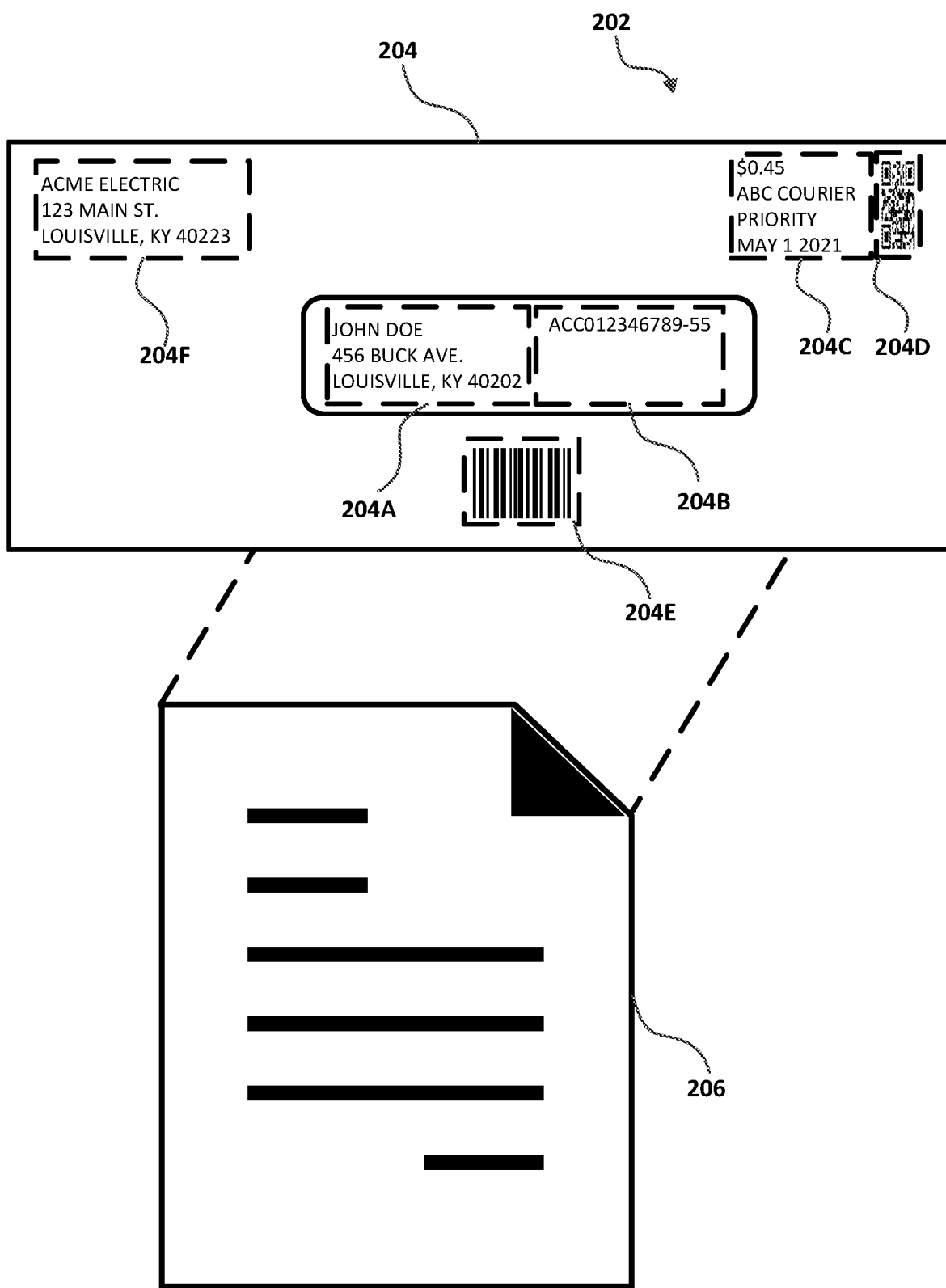
FIG. 2 illustrates one example of a physical parcel, including an exterior of the physical parcel and interior contents of the physical parcel.

As one particular example, and with reference to FIG. 2, a physical parcel 202 is illustrated that includes an externally visible portion 204 and interior contents 206. The interior contents 206 include paper with printed information that is tailored to a particular recipient. The interior contents 206 are illustrated in FIG. 2 but, as indicated by the breakaway (dashed) lines connecting the interior contents 206 and the visible portion 204, the interior contents 206 will be enclosed within the visible portion 204 of the physical parcel and will not be externally visible. The externally visible portion 204 includes a recipient address 204A, a sender specified ID 204B, postage textual information 204C, a postage 2D barcode 204D, a 1D barcode 204E, and a return address 204F. The sender specified ID 204B can be generated by the sending entity and can be, for example, a unique (to the sending entity) identifier for a mailing campaign, for the recipient, or for the physical parcel 202. The postage textual information 204C specifies the postage amount ($0.45), the courier entity (ABC Couture), a class of postage (Priority), and a mailing date (May 1, 2021). Additional or alternative information can be included in the postage textual information 204C, such as a courier specified ID of the sender, an ID of the device utilized to print the postage, and/or other data. The postage 2D barcode 204D encodes corresponding data. The corresponding data can be decoded by a barcode reader, but the decoded data may be encrypted and not readily interpretable (e.g., without a private key of the courier entity). The barcode 204E can be a courier provided intelligent mail barcode or a sender provided barcode that is specific to a mailing campaign, to the recipient, or to the physical parcel 202. Although particular exterior features are illustrated in FIG. 2, it is understood that parcels can include additional and/or alternative exterior features and one or more of those can be utilized in generating a UPI.

Continuing with the particular example, the UPI engine 122 can generate a UPI for the physical parcel 202 as a function of the position and/or the contents of one or more of the features 204A-F. For example, the position and/or the contents can be applied to a parcel hash function to generate a parcel hash, and the parcel hash utilized as the UPI for the physical parcel 202. For instance, the text of the recipient address 204A, the text of the return address 204F, and the text of the sender specified ID 204B can be applied to the parcel hash function to generate the parcel hash. The text can be determined, from an image of the parcel 204, using optical character recognition (OCR), using optical scanning and image reconciliation, and/or using other technique(s). As another instance, the text of the recipient address 204A, decoded data from the postage 2D barcode 204D, decoded data from the 1D barcode 204E, and the date from the postage textual information 204C can be applied to the parcel hash function to generate the parcel hash. As yet another instance, the text of the recipient address 204A, decoded data from the 1D barcode 204E, the distance between the 1D barcode 204E and the return address 204F, and the distance between the 1D barcode 204E and the postage 2D barcode 204D can be applied to the parcel hash function to generate the parcel hash. The distance between two features can be determined, for example, based on a distance between centers or edges of bounding boxes bounding each of the items. The bounding boxes can be generated, for example, based on processing an image of the exterior of the externally visible portion using an object detection machine learning model. The distances can be in discrete increments (e.g., 0.2" increments, 0.1" increments, or other increments) to enable determining the same distance across different images of the physical parcel 202 (e.g., due to slightly different bounding boxes being generated based on the different images). Put another way, discretizing the distances and/or other position information enables consistent generation of a particular UPI for a given parcel across images, despite variations across the images.

The RI engine 124, when provided, can generate recipient information (RI) for a physical parcel based on a recipient address for the physical parcel. The RI can uniquely identify the recipient. For example, the RI engine 124 can generate the RI for a physical parcel based on applying all or parts of text of the recipient address to a recipient hash function. The text of the recipient address can be determined based on the virtual parcel data 134 or based on processing sender image(s) 134 of the generated physical parcel. Which parts of the recipient address are utilized in generating the RI can be dependent on the granularity with which the recipient is defined. For example, when the recipient is defined at an individual level, the entirety of a recipient name, in the recipient address, can be utilized in addition to non-name address information (e.g., street, City, State, Zip Code, Apartment or Suite Number, etc.). As another example, when the recipient is defined at a family or business level, only the non-name address portion can be considered or only the non-name address portion and a surname of the name portion of the recipient address.

The interaction engine 126 can interact with the intermediary system 140 via one or more local and/or wide area networks (e.g., the Internet) that are indicated generally at 101. For example, the interaction engine 126 can transmit a request, to intermediary system 140 and via network(s) 101, that includes interior content data for a parcel and that includes a corresponding UPI and RI for the parcel and/or that includes corresponding sender image(s) and/or virtual parcel data (e.g., virtual image(s) and/or structured virtual data) for the parcel. As described herein, in response to receiving the request, verifying it is from an authorized sender, and verifying the RI, the intermediary system 140 can cause the interior content data of the request to be stored in association with the UPI. As another example, the interaction engine 126 can transmit, to the intermediary system 140, requests to view certain data related to UPI(s) that the sending entity is authorized to access. Requests from the sender system 120 can include digital token(s) and/or digital certificate(s) to authenticate the request as originating from a valid entity and to enable resolving that the request originated from the sender system 120. The digital token(s) and/or the digital certificate(s) can be managed by the intermediary system 140 and/or the courier system 160 and can be issued responsive to one or more verification interaction(s) to confirm the sender system 120.

The adaptation engine 128 can interact with the interaction engine 126, in determining whether to adapt processing related to a physical parcel. For example, the adaptation engine 128 can, in response to interaction engine 126 retrieving data that indicates a recipient viewed interior content data for a parcel and/or provided certain input(s) indicating they wish to forego or delay delivery, determine to suppress actual generation of the physical parcel and/or determine to delay provisioning of the physical parcel to the courier entity for delivery. For example, the adaptation engine 128 can cause suppressing of actual generation of the physical parcel by sending, to an automated mail generation system (e.g., implemented by generation engine 129), a command that identifies a virtual counterpart to the physical parcel and that causes the virtual counterpart to be removed from a processing queue of the automated mail generation system. As another example, the virtual counterpart may not yet have been provided to the automated mail generation system and can be removed, by the adaptation engine 128, from a set of data queued for providing to the automated mail generation system. Foregoing generation of the physical parcel conserves use of material and power resources that would otherwise be utilized in generating the physical parcel. As yet another example, the adaptation engine 128 can cause delaying of provisioning of the physical parcel to the courier entity by providing a command that causes the mail generation system to sort the physical parcel, once generated, into a separate bundle of parcels for delayed transportation to the courier entity or delayed pick-up by the courier entity.

The generation engine 129 can implement all or part of an automated mail generation system. The generation engine 129 can generate actual physical parcels based on virtual parcel data 134 as described herein. The generation engine 129 can additionally or alternatively capture image(s) of generated parcels, and cause such image(s) to be stored as sender image(s) 136.

The intermediary system 140 can be implemented by one or more servers (e.g., a cluster of cloud-based servers). The intermediary system 140 is illustrated as including a UPI engine 142, an RI engine 144, an interaction engine 146, a blockchain engine 147, and an authentication engine 148. One or more of the engines 142, 144, 146, and/or 148 can be omitted in various implementations. For example, UPI engine 122 and RI engine 124 can be omitted in some implementations where sender system 120 and courier system 160 include local counterparts. However, it is noted that in various implementations it is advantageous for intermediary system 140 to include UPI engine 122 and RI engine 124 and to have sender system 120 and courier system 160 provide image(s) and/or structured data for parcels from which UPI engine 122 can generate UPIs and RI engine 124 can generate RIs. This can help ensure sender system 120 and courier system 160 are in actual possession and/or control of corresponding physical parcels (thereby preventing potential nefarious generation of "ghost" parcel entries) and/or can help ensure that accurate UPIs and/or RIs are generated (thereby ensuring data integrity).

The intermediary system 140 also includes and/or interfaces with one or more blockchains 150. In some implementations, the blockchains include a parent blockchain having recipient nodes R1 150A through RN 150N (this can constitute thousands or millions of recipient nodes). Each of the recipient nodes 150A-N corresponds to a particular recipient and can include (e.g., in a header) recipient information that corresponds to the recipient. For example, recipient node R1 150A can correspond to three individuals at a particular residential address and can include recipient information for each of the three individuals. For instance, the recipient information for a first of the individuals can be a hash of the non-name information of the a recipient address and of a name of the first of the individuals, the recipient information for a second of the individuals can be a hash of the non-name information of the recipient address and of a name of the second of the individuals, the recipient information for a third of the individuals can be a hash of the non-name information of the recipient address and of a name of the third of the individuals. In these and other manners, the RI generated for a parcel addressed to any of the three individuals can be matched to the recipient node R1 150A (i.e., since recipient node R1 150A includes three RIs, one for each of the individuals). As another example, recipient node RN 150N can correspond to a particular residential address and can include recipient information for the particular residential address. For instance, the recipient information can be a hash of the non-name information of the recipient address (and without considering the name of the recipient address). As yet another example, a non-illustrated (but represented by the ellipsis) recipient node can correspond to a single individual at a particular residential address and can include recipient information for the single individual and the particular residential address. For instance, the recipient information can be a hash of a first alias of the single individual and of the non-name information of the recipient address and second recipient information can be a hash of a second alias of the single individual and of the non-name information of the recipient address.

Each of the parent blockchain recipient nodes 150A-N is linked, directly or indirectly by a cross chain bridge, with a corresponding child blockchain. For example, the recipient node 150A is linked with a child blockchain for the recipient node 150A. Some of the data blocks of the child blockchain are illustrated, with others being generally indicated by the vertical ellipsis extending between 150A1B and 150A1N and the horizontal ellipsis extending between 150A1A and 150ANA. The data blocks of the child blockchain include data blocks R1P1A 150A1A, R1P1B 150A1B, and R1P1N 150A1N. As indicated by the "P1" designation, each of the data blocks 150A1A-N correspond to the same parcel (e.g., can each include the same UPI for the parcel). However, each includes different information. For example, data block 150A1A can include the interior content data for the parcel, data block 150A1B can indicate that the recipient accessed the interior content and include details of the access, and data block 105A1N can indicate that the courier entity confirmed the parcel was physically delivered. The data blocks of the child blockchain also include data blocks R1PNA 150ANA and R1PNB 150ANB. As indicated by the "PN" designation, both of the data blocks 150ANA and 150ANB correspond to the same parcel. However, each includes different information. For example, data block 150ANA can include the interior content data for the parcel and data block 150ANB can include a smart contract for the parcel.

The UPI engine 142, when provided, can generate a UPI for a physical parcel based on content and/or position(s) of one or more exterior features that are externally visible on a generated physical parcel (or that will be externally visible on a yet to be generated physical parcel). The UPI engine 142 can share one or more aspects in common with UPI engine 122 of sender system 120 (described above).

The RI engine 144, when provided, can generate recipient information (RI) for a physical parcel based on a recipient address for the physical parcel. The RI can uniquely identify the recipient. The RI engine 144 can share one or more aspects in common with RI engine 124 of sender system 120 (described above).

The interaction engine 146 can interact with the sender system 120, the courier system 160, and/or the recipient device 170, via network(s) 101. For example, the interaction engine 146 can receive, from such systems, requests to write and/or read data to blockchain(s) 150. The interaction engine 146 can interact with the blockchain engine 147 in acting on those requests. Further, the interaction engine 146 and/or the blockchain engine 147 can interact with the authentication engine 148 in authenticating that requests to write data blocks to the blockchain(s) 150 are from a verified party that has permissions to write the data and in authenticating that requests to read data blocks from blockchain(s) 150 are from a verified party that has permissions to access the data blocks.

As one example, the interaction engine 146 can receive a request, from sender system 120, that includes interior content data for a parcel and that includes corresponding sender image(s) and/or virtual parcel data (e.g., virtual image(s) and/or structured virtual data) for the parcel. In response to receiving the request, the authentication engine 148 can determine whether it is from an authorized sender that has permissions to write interior content data to the blockchain(s) 150. If so, the UPI engine 142 can generate a UPI based on the sender image(s) and/or virtual parcel data and the RI engine 144 can generate the RI based on the sender image(s) and/or virtual parcel data. The blockchain engine 147 can utilize the RI to determine if one of the recipient nodes 150A-N matches the RI (e.g., includes the RI). If not, the blockchain engine 147 can interface with the interaction engine 146 to cause an error to be returned, to the corresponding entity and in response to the request, indicating that the recipient is invalid. If so, the blockchain engine 147 can cause a new data block to be created, in a child blockchain linked to the matching recipient node, where the new data block includes the interior content data and the UPI.

The courier system 160 can be implemented by one or more servers (e.g., a cluster of cloud-based servers). The courier system 160 is illustrated as including a UPI engine 162, an RI engine 164, an interaction engine 166, an adaptation engine 168, and an authentication engine 169. One or more of the engines 162, 164, 166, 168, and/or 169 can be omitted in various implementations. For example, UPI engine 122 and RI engine 124 can be omitted in some implementations. As another example, authentication engine 169 can be omitted in implementations wherein authentication engine 148 (of intermediary system 140) handles authentication for all parties.

The courier system 160 also includes courier images 172 and recipient data 174. Courier images 172 can include, for each of a plurality of already generated physical parcels that have been processed by courier system 160 (e.g., via mail storing system(s) 180 of courier system 160 or interacting with courier system 160). For example, mail sorting system(s) 180 can capture image(s) (or other visual data) of a parcel as it processes the parcel and provide the image(s) for storage in courier images 172, optionally along with status data for each of the images. For example, the status data for a first image of a parcel can indicate the parcel was initially received at an initial courier location, the status data for a second image of the parcel can indicate the parcel is at a final courier location, and the status data for a third image of the parcel can indicate the parcel is being loaded for delivery to the recipient.

The recipient data 172 can include, for example, proprietary data of the courier entity that indicates valid recipients. The courier system 160 can selectively share aspects of the recipient data 172, with the blockchain engine 147 of intermediary system 140. The blockchain engine 147 can utilize such shared aspects in determining when to add new recipient node(s) to the parent blockchain of blockchain(s) 150 and/or to expire/mark as inactive existing recipient node(s) 150A-N. Alternatively, the courier system 160 can directly control adding recipient nodes to and/or expiring recipient nodes from the parent blockchain.

The UPI engine 162, when provided, can generate a UPI for a physical parcel based on content and/or position(s) of one or more exterior features that are externally visible on a generated physical parcel (or that will be externally visible on a yet to be generated physical parcel). The UPI engine 162 can share one or more aspects in common with UPI engine 122 of sender system 120 (described above).

The RI engine 164, when provided, can generate recipient information (RI) for a physical parcel based on a recipient address for the physical parcel. The RI can uniquely identify the recipient. The RI engine 164 can share one or more aspects in common with RI engine 124 of sender system 120 (described above).

The interaction engine 166 can interact with the intermediary system 140 via network(s) 101 in writing data to and/or reading data from the blockchain(s) 150. For example, the interaction engine 166 can transmit a request, to intermediary system 140, that includes status data for a parcel and that includes corresponding courier image(s) for the parcel. As described herein, in response to receiving the request, verifying it is from an authorized courier entity, and verifying the RI generated based on the request, the intermediary system 140 can cause the status data of the request to be stored in association with the UPI. As another example, the interaction engine 166 can transmit, to the intermediary system 140, requests to view certain data related to UPI(s) that the courier system 160 is authorized to access. Requests from the courier system 160 can include digital token(s) and/or digital certificate(s) to authenticate the request as originating from a valid entity.

The adaptation engine 168 can interact with the interaction engine 166, in determining whether to adapt processing related to a physical parcel. For example, the adaptation engine 168 can determine, in response to interaction engine 166 retrieving data that indicates a recipient viewed interior content data for a parcel (it is noted that such data can be in a data block that is separate from the data block that contains the interior content data) and/or provided certain input(s) indicating they wish to forego or delay delivery, determine to suppress delivery of the physical parcel (e.g., instead route it for destroying and/or recycling) and/or to delay delivery of the physical parcel (e.g., utilize a lower class of delivery service). For example, the adaptation engine 168 can cause suppressing of delivery of the physical parcel by sending, to mail sorting system(s) 180, a command that causes the mail sorting system(s) 180 to direct the parcel into a bundle of parcels slated for recycling and/or destroying. As yet another example, the adaptation engine 168 can cause delay of delivery of the physical parcel by providing a command that causes the mail sorting system 180 to sort the physical parcel into a separate bundle of parcels for delayed delivery by the courier entity.

The authentication engine 169, when provided, can be used to authenticate recipient device 170 and to route that authentication to intermediary system 140. For example, the courier system 160 may have already verified the recipient device 170 (and/or associated recipient) and can implement authentication of the recipient device 170 as part of the courier system 160. In such an example, the courier system 160 can share the authentication (e.g., share digital token(s) and/or digital certificate(s)) with intermediary system 140 to enable the intermediary system to authenticate requests from recipient device 170 and/or to determine read and/or write permissions for the recipient device 170. In other implementations, authentication engine 148 of intermediary system 140 can handle all or some of the authentication of recipient device 170.

Figure 12A:
FIGS. 12A and 12B illustrate example graphical user interfaces that can be utilized by a recipient in interacting with a parcel, according to some implementations disclosed herein.
Figure 12A:
Figure 12B:
Figure 12B:
Figure 12B:
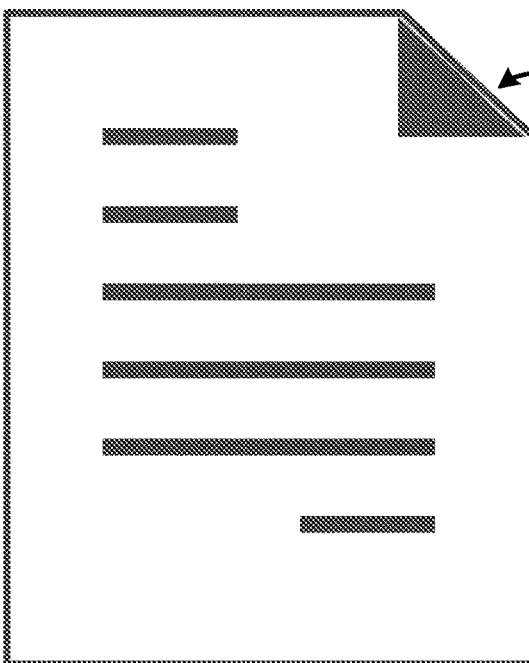

Recipient device 170 can include corresponding web browsers and/or other application(s) for rendering graphical user interface(s) (GUI(s)) described herein and can include corresponding input device(s) (e.g., keyboard, touchscreen, mouse, microphone(s)) for providing various input(s) to GUI(s) described herein (e.g., those illustrated in FIGS. 12A and 12B). The recipient device 170 can additionally or alternatively include speaker(s) for audibly rendering content described herein. The recipient device 170 can interact with the intermediary system 140 (directly or via courier system 160) in writing data to and/or reading data from the blockchain(s) 150. For example, a user can log-in to a corresponding account via the recipient device 170, and that log-in utilized to authenticate the recipient device. Further, the authentication can be associated with a particular recipient node of the blockchain(s) 150 and enable read access to some or all of the child block chain linked to the recipient node and/or enable certain write access (e.g., writing of interaction data). The recipient device 170 can be a client device such as a desktop computing device, a laptop computing device, a tablet computing device, a mobile phone computing device, and/or a wearable apparatus that includes a computing device (e.g., a watch having a computing device, glasses having a computing device, a virtual or augmented reality computing device).

Turning now to FIGS. 3-11, various example methods are described that can be implemented by component(s) of the example environment of FIG. 1.

Figure 3:
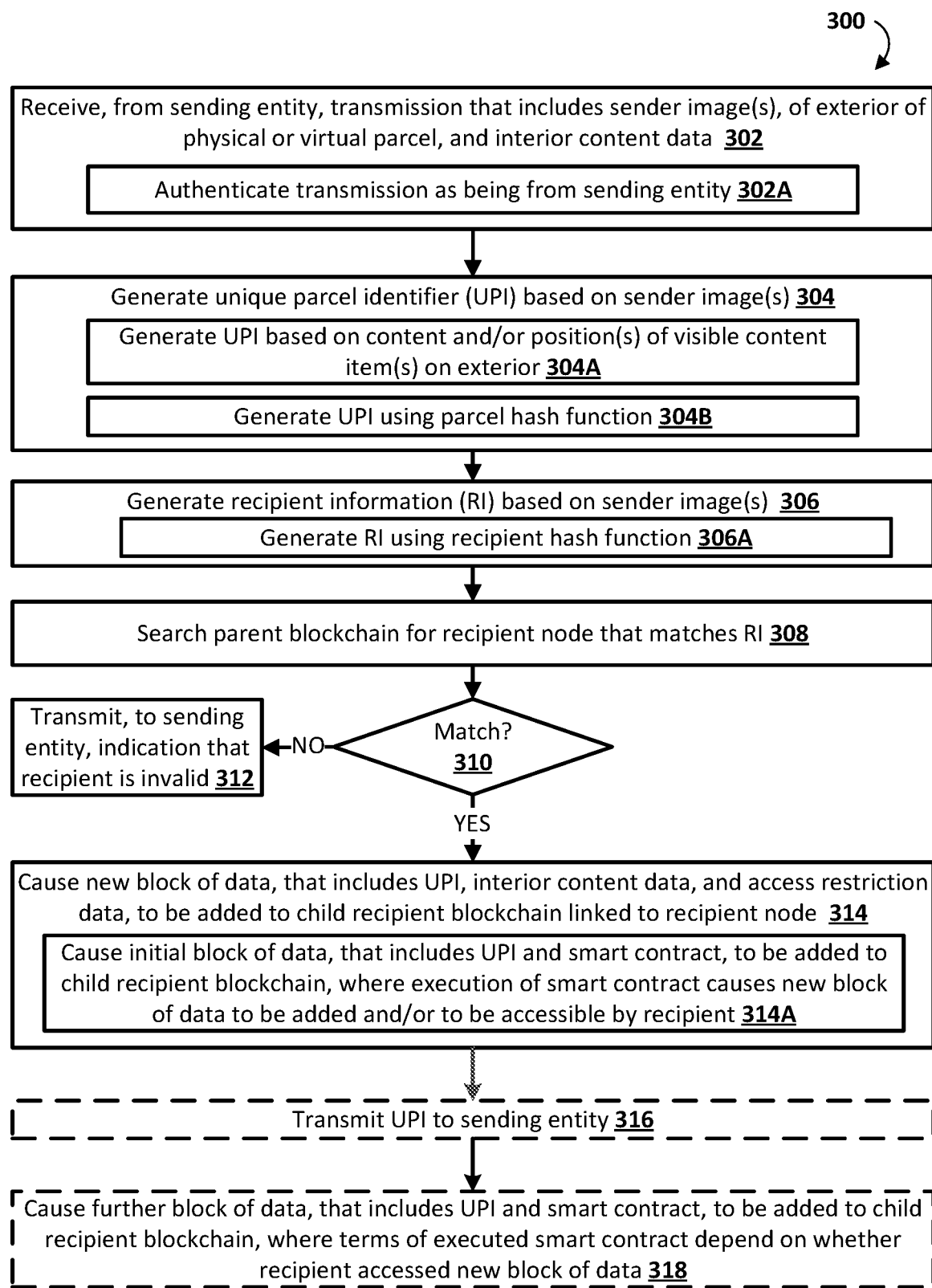
FIG. 3 is a flowchart illustrating an example method of causing block(s) of data to be added to a child recipient blockchain in response to a transmission from a sending entity.

FIG. 3 is a flowchart illustrating an example method 300 of causing block(s) of data to be added to a child recipient blockchain in response to a transmission from a sending entity. For convenience, the operations of the flow chart are described with reference to a system that performs the operations. This system may include various components of various computer systems, such as one or more components of intermediary system 140 of FIG. 1. Moreover, while operations of method 300 are shown in a particular order, this is not meant to be limiting. One or more operations may be reordered, omitted or added.

At block 302, the system receives, from a sending entity, a transmission that includes sender image(s), of an exterior of a physical or virtual parcel, and interior content data. The interior content data can include reproduction data and/or metadata as described herein. Block 302 optionally includes sub-block 302A, in which the system authenticates the transmission as being from a verified sending entity. For example, the system can require authenticating the transmission as being from a verified party before further processing the transmission. Also, for example, the system can additionally or alternatively require authenticating the transmission is from a verified sending entity since the transmission includes the interior content data and only verified sending entities can be allowed to write interior content data.

At block 304, the system generates a UPI based on the sender image(s) of the transmission of block 302. Block 304 can optionally include sub-block(s) 304A and/or 304B. At sub-block 304A, the system generates the UPI based on content and/or position(s) of visible content item(s) on the exterior. For example, the sender image(s) can be processed to determine text and/or other content included on the exterior, and the UPI generated based on the text and/or other content. At sub-block 304B, the system generates the UPI using a parcel hash function (e.g., by applying the content and/or position9s).

At block 306, the system generates recipient information (RI) based on the sender image(s) of the transmission of block 302. For example, the system can generate the recipient information based on text, of a recipient address, where the text is determined based on processing the sender image(s). Block 306 can optionally include sub-block 306B, where the system generates the RI using a recipient hash function.

At block 308, the system searches the parent blockchain for a recipient node that matches the RI generated at block 306.

At block 310, the system determines whether a matching recipient node has been located. If not, the system proceeds to block 312 and transmits, to the sending entity, an indication that the recipient is invalid. Transmitting such an indication can prevent the waste of power and/or materials resources in generating and/or providing to a courier, a parcel that includes an invalid recipient address.

If, at block 310 the system determines there is a matching recipient node, the system proceeds to block 314 and causes a new block of data, that includes the UPI, the interior content data, and access restriction data, to be added to a child recipient blockchain linked to the recipient node. For example, the request can be sent to the parent blockchain and, if verified by the parent block chain, transmitted to the child recipient blockchain, optionally using a cross chain bridge. The access restriction data can restrict access, to the new block of data, to the recipient and optionally to the sending entity.

In some implementations, block 314 includes sub-block 314A. At sub-block 314A, the system causes an initial block of data, that includes the UPI and a smart contract, to be added to the child recipient blockchain, where execution of smart contract causes the new block of data (of block 314) to be added and/or to be accessible by the recipient. For example, the smart contract can require, for execution, a separate transmission, from the courier entity, that includes courier image(s) of the parcel or a UPI of the parcel and that indicates receipt of the parcel by the courier entity and/or that indicates pecuniary consideration has been provided, by the sending entity to the courier entity, for the physical or virtual parcel. For instance, the smart contract, when executed, can cause the new block of data to be added, but a condition of the smart contract can be creation of an additional block of data, in the child block chain, that includes the UPI and that indicates pecuniary consideration has been provided to the courier entity. Such a block can be created in response to receiving, from the courier entity, the UPI (or image(s) that when processed generate the UPI) and an indication that pecuniary consideration has been provided to the courier entity.

At optional block 316, the UPI is transmitted to the sending entity. This can enable the sending entity to access, from the blockchain, block(s) related to the UPI. Alternatively, the UPI may not be transmitted and the sending entity can access block(s) by providing sender image(s) that the system can then convert to a corresponding UPI.

At optional block 318, the system causes a further block of data, that includes the UPI and a smart contract, to be added to child recipient blockchain, where terms of the executed smart contract depend on whether recipient accessed the new block of data (of block 314) that includes the interior content data and, optionally, whether the user provided certain user interface input(s) when accessing the data. As one example, the smart contract can dictate whether a first lower pecuniary consideration is provided (by the sending entity to the courier entity) for virtual only delivery of the interior content data (and without any physical delivery of the physical parcel) or, rather, a second higher pecuniary consideration is provided for physical delivery. Terms of the smart contract can dictate that the first pecuniary consideration is provided when the recipient, within a threshold amount of time, accessed the new block of data and viewed the interior content data and, optionally, provided user input(s) indicating a desire to forego delivery of the physical parcel—otherwise the second higher pecuniary consideration is provided. Further, the terms of the smart contract can dictate that, when the first pecuniary consideration is provided, the courier entity will destroy the undelivered parcel or that the sending entity will not provide the parcel (or may not have even generated it) to the courier entity for delivery. Whether the recipient, within a threshold amount of time, accessed the new block of data and viewed the interior content data and, optionally, provided user input(s) indicating a desire to forego delivery of the physical parcel, can be determined with reference to the child blockchain and utilizing the UPI (as such access and/or interaction would be recorded in new block(s) of data).

As another example, the smart contract can dictate whether a first lower pecuniary consideration is provided (by the sending entity to the courier entity) for a slower delivery of the physical parcel or, rather, a second higher pecuniary consideration is provided for a faster delivery of the physical parcel. Terms of the smart contract can dictate that the first pecuniary consideration is provided when the recipient, within a threshold amount of time, accessed the new block of data and viewed the interior content data and, optionally, provided user input(s) indicating a desire to forego delivery of the physical parcel—otherwise the second higher pecuniary consideration is provided.

Figure 4:
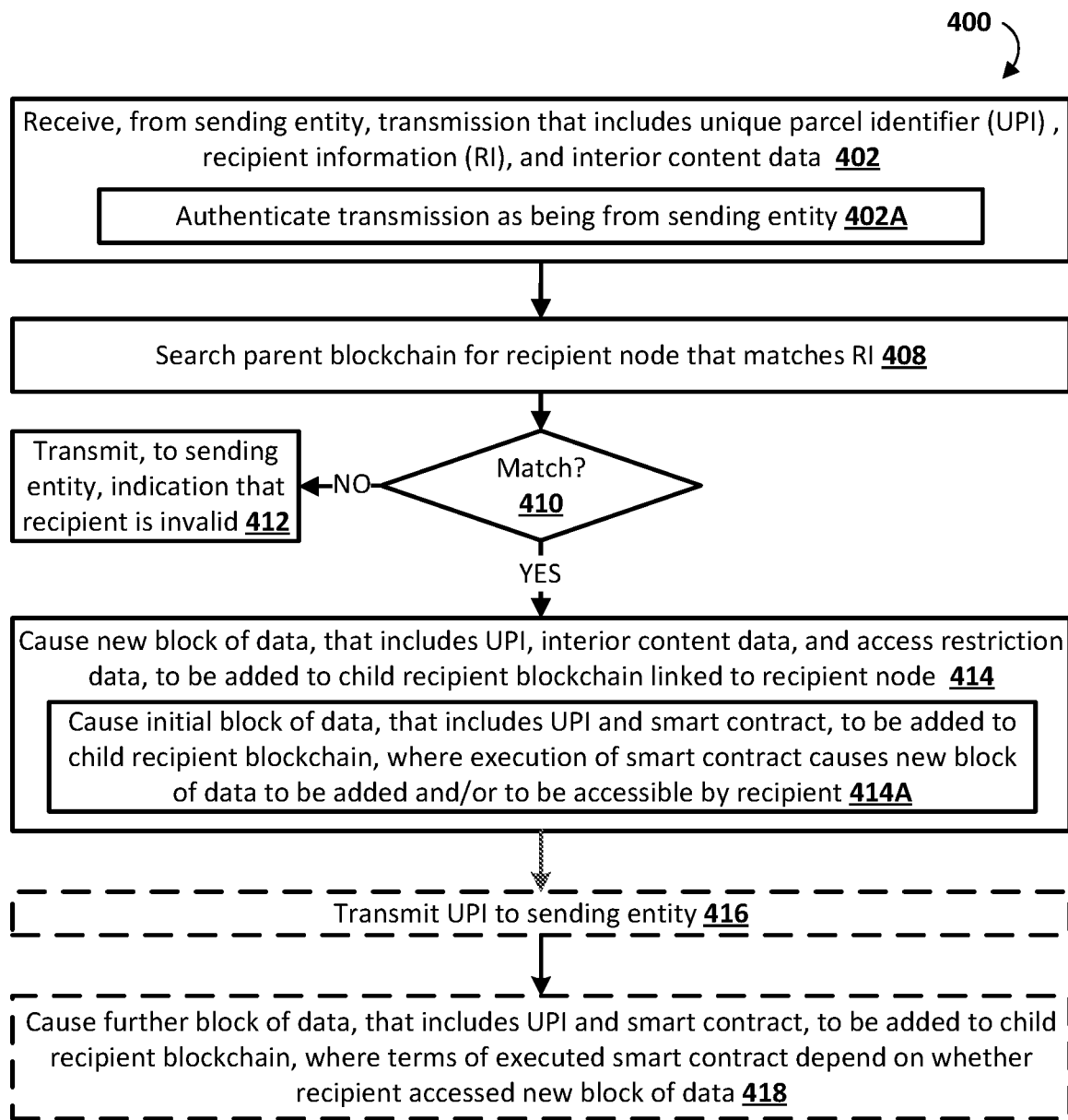
FIG. 4 is a flowchart illustrating another example method of causing block(s) of data to be added to a child recipient blockchain in response to a transmission from a sending entity.

FIG. 4 is a flowchart illustrating another example method 400 of causing block(s) of data to be added to a child recipient blockchain in response to a transmission from a sending entity. For convenience, the operations of the flow chart are described with reference to a system that performs the operations. This system may include various components of various computer systems, such as one or more components of intermediary system 140 of FIG. 1. Moreover, while operations of method 400 are shown in a particular order, this is not meant to be limiting. One or more operations may be reordered, omitted or added.

Method 400 of FIG. 4 has similarities with method 300 of FIG. 3. However, the transmission, from the sending entity, that is received at block 402, includes a UPI and RI in lieu of including sender image(s) on which the UPI and RI are generated.

More particularly, at block 402 the system receives, from the sending entity, a transmission that includes a UPI, an RI, and interior content data. Block 402 optionally includes sub-block 402A, in which the system authenticates the transmission as being from a verified sending entity.

At block 408, the system searches the parent blockchain for a recipient node that matches the RI. At block 410, the system determines whether a matching recipient node has been located. If not, the system proceeds to block 412 and transmits, to the sending entity, an indication that the recipient is invalid. If so, the system proceeds to block 414 and causes a new block of data, that includes the UPI, the interior content data, and the access restriction data, to be added to a child recipient blockchain linked to the recipient node.

In some implementations, block 414 includes sub-block 414A, where the system causes an initial block of data, that includes the UPI and a smart contract, to be added to child recipient blockchain, where execution of smart contract causes the new block of data to be added and/or to be accessible by recipient.

At optional block 416, the UPI is transmitted to the sending entity.

At optional block 418, the system causes a further block of data, that includes the UPI and a smart contract, to be added to child recipient blockchain, where terms of the executed smart contract depend on whether recipient accessed the new block of data that includes the interior content data and, optionally, whether the user provided certain user input(s) when accessing the data.

Figure 5:
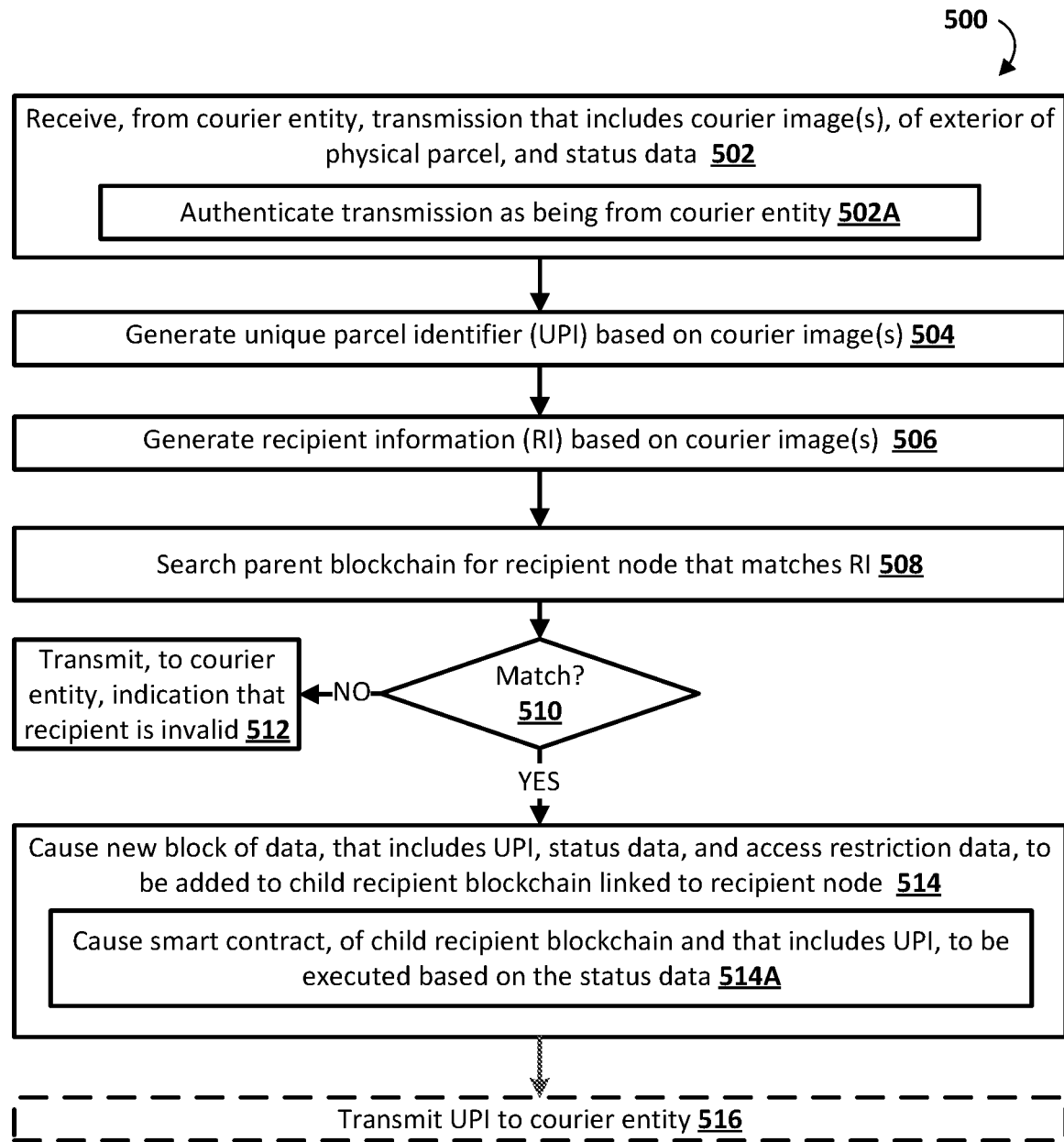
FIG. 5 is a flowchart illustrating an example method of causing block(s) of data to be added to a child recipient blockchain in response to a transmission from a courier entity.

FIG. 5 is a flowchart illustrating an example method 500 of causing block(s) of data to be added to a child recipient blockchain in response to a transmission from a courier entity. For convenience, the operations of the flow chart are described with reference to a system that performs the operations. This system may include various components of various computer systems, such as one or more components of intermediary system 140 of FIG. 1. Moreover, while operations of method 500 are shown in a particular order, this is not meant to be limiting. One or more operations may be reordered, omitted or added.

At block 502, the system receives, from a courier entity, a transmission that includes courier image(s), of an exterior of a physical parcel, and status data. Block 502 optionally includes sub-block 502A, in which the system authenticates the transmission as being from a verified courier entity. For example, the system can require authenticating the transmission as being from a verified party before further processing the transmission. Also, for example, the system can additionally or alternatively require authenticating the transmission is from a verified courier entity since the transmission includes the status data and only verified sending entities can be allowed to write status data.

At block 504, the system generates a UPI based on the courier image(s) received at block 502.

At block 506, the system generates RI based on the courier image(s) received at block 502.

At block 508, the system searches the parent blockchain for a recipient node that matches the RI generated at block 506.

At block 510, the system determines whether a matching recipient node has been located. If not, the system proceeds to block 512 and transmits, to the courier entity, an indication that the recipient is invalid. Transmitting such an indication can prevent the waste of power and/or materials resources in further processing and/or attempting delivery of a parcel to an invalid recipient address.

If, at block 510 the system determines there is a matching recipient node, the system proceeds to block 514 and causes a new block of data, that includes the UPI, the status data, and access restriction data, to be added to a child recipient blockchain linked to the recipient node. The access restriction data can restrict access, to the new block of data, to the recipient, the courier entity, and optionally the sending entity. Put another way, access can be allowed for the recipient, the courier entity, and optionally the sending entity—while prevented for all other parties.

In some implementations, block 514 includes sub-block 514A. At sub-block 514A, the system causes a smart contract, of the child recipient blockchain and that includes the UPI generated at block 504, to be executed based on the status data. Put another way, the smart contract can have a condition that is based on the status data, and can be executed in response to the status data being included in the block of data at block 514. For example, the smart contract can be one described with respect to block 314A of method 300 of FIG. 3, and generated at block 314A of method 300.

At optional block 516, the system transmits the UPI to the courier entity. This can enable the courier entity to access, from the blockchain, block(s) related to the UPI. Alternatively, the UPI may not be transmitted and the courier entity can access block(s) by providing courier image(s) that the system can then convert to a corresponding UPI.

Figure 6:
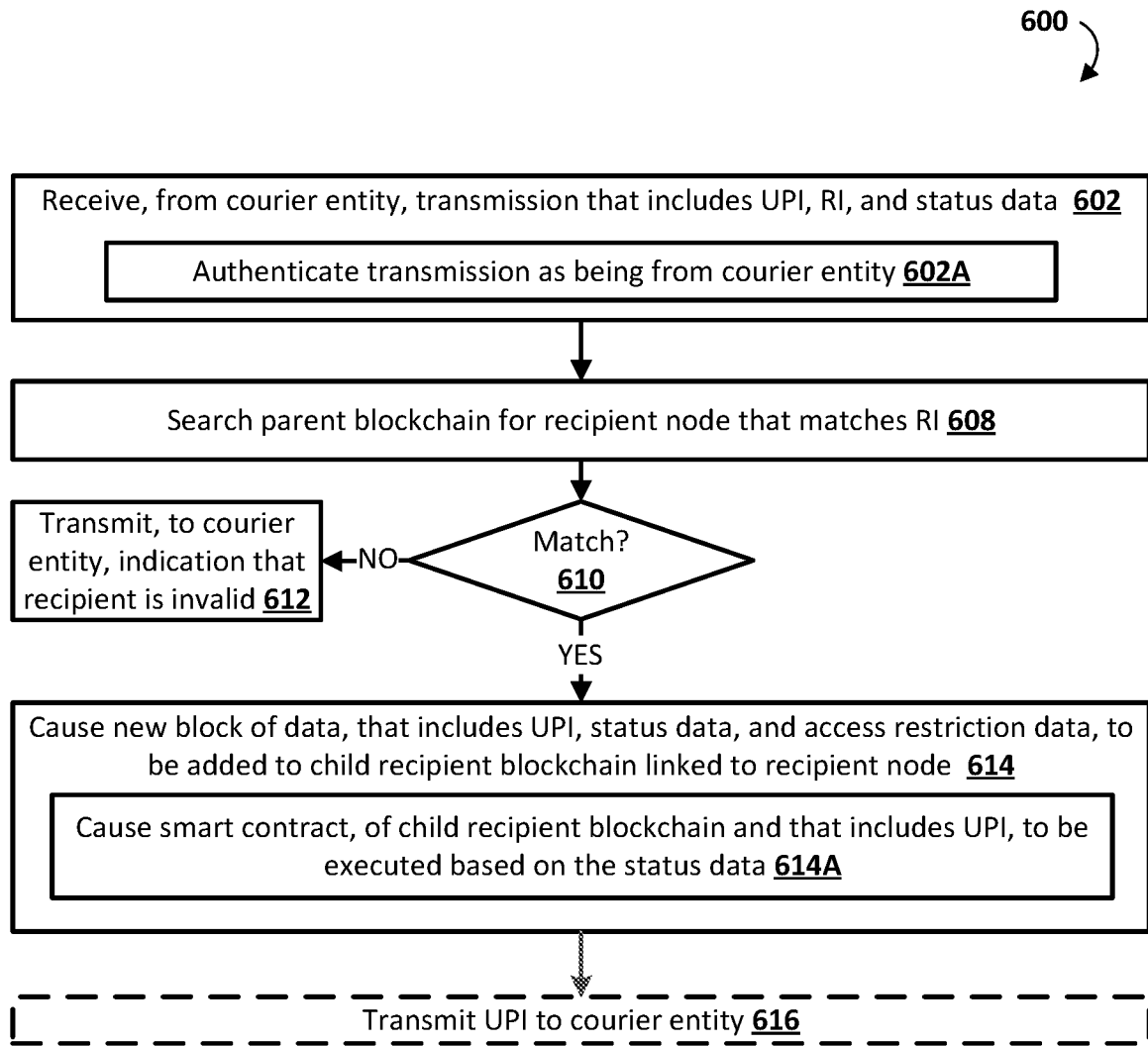
FIG. 6 is a flowchart illustrating another example method of causing block(s) of data to be added to a child recipient blockchain in response to a transmission from a courier entity.

FIG. 6 is a flowchart illustrating another example method 600 of causing block(s) of data to be added to a child recipient blockchain in response to a transmission from a courier entity. For convenience, the operations of the flow chart are described with reference to a system that performs the operations. This system may include various components of various computer systems, such as one or more components of intermediary system 140 of FIG. 1. Moreover, while operations of method 600 are shown in a particular order, this is not meant to be limiting. One or more operations may be reordered, omitted or added.

Method 600 of FIG. 6 has similarities with method 500 of FIG. 5. However, the transmission, from the courier entity, that is received at block 602, includes a UPI and RI in lieu of including courier image(s) on which the UPI and RI are generated.

More particularly, at block 602 the system receives, from the courier entity, a transmission that includes a UPI, RI, and status data. Block 602 optionally includes sub-block 602A, in which the system authenticates the transmission as being from a verified courier entity.

At block 608, the system searches a parent blockchain for a recipient node that matches the RI received at block 602.

At block 610, the system determines whether a matching recipient node has been located. If not, the system proceeds to block 612 and transmits, to the courier entity, an indication that the recipient is invalid. If so, the system proceeds to block 614 and causes a new block of data, that includes the UPI, the status data, and access restriction data, to be added to a child recipient blockchain linked to the recipient node.

In some implementations, block 614 includes sub-block 614A. At block 614A, the system causes a smart contract, of the child recipient blockchain and that includes the UPI received at block 602, to be executed based on the status data.

At optional block 616, the system transmits the UPI to the courier entity

Figure 7:
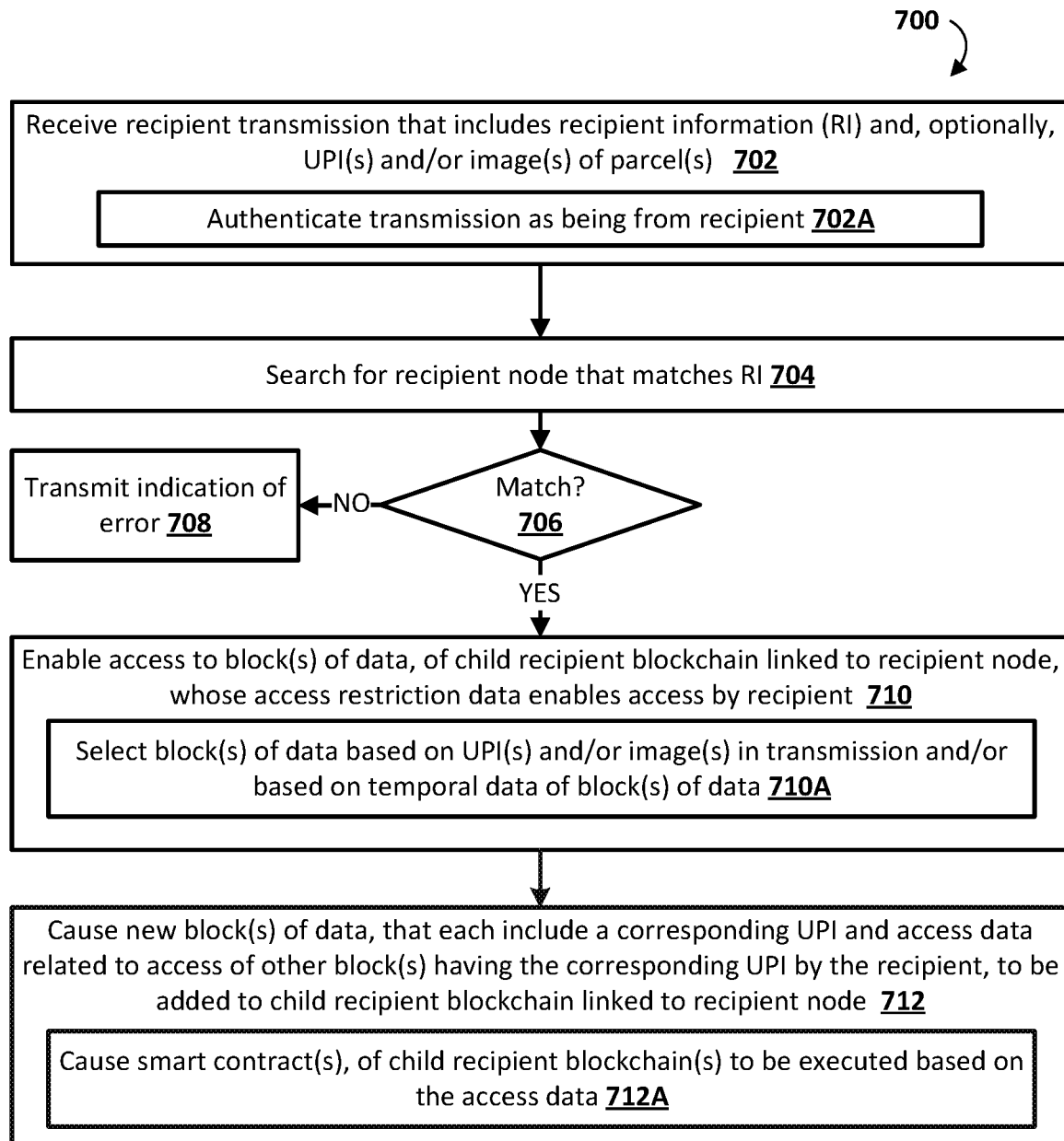
FIG. 7 is a flowchart illustrating an example method of enabling access, by a recipient, to block(s) of data of a child recipient blockchain and/or adding new block(s) of data in response to access of the block(s) by the recipient.

FIG. 7 is a flowchart illustrating an example method 700 of enabling access, by a recipient, to block(s) of data of a child recipient blockchain and/or adding new block(s) of data in response to access of the block(s) by the recipient. For convenience, the operations of the flow chart are described with reference to a system that performs the operations. This system may include various components of various computer systems, such as one or more components of intermediary system 140 of FIG. 1. Moreover, while operations of method 700 are shown in a particular order, this is not meant to be limiting. One or more operations may be reordered, omitted or added.

At block 702, the system receives a recipient transmission that includes recipient information (RI) and, optionally, UPI(s) and/or image(s) of parcel(s). For example, the recipient transmission can be from a corresponding client device, and optionally provided via a courier system. Block 702 optionally includes sub-block 702A, in which the system authenticates the transmission as being from a verified recipient. For example, the system can require authenticating the transmission as being from a verified recipient for the RI before further processing the recipient transmission.

At block 704, the system searches for a recipient node that matches the RI received in the transmission at block 702. For example, the system can search a parent blockchain for a recipient node that matches the RI received at block 702.

At block 710, the system determines whether a matching recipient node has been located. If not, the system proceeds to block 708 and transmits, to the recipient device, an indication that the recipient is invalid. If so, the system proceeds to block 710 and enables access to block(s) of data, of a child recipient blockchain linked to recipient node, whose access restriction data enables access by the recipient. For example, the system can enable access to all block(s) of data, of the child recipient blockchain, whose access restriction data enables access by the recipient. In some implementations, enabling access includes providing access for rendering of corresponding data, of the block(s) of data, by a graphical user interface (GUI), such as the GUI(s) of FIG. 12A and/or 12B. In some implementations, block 710 further includes rendering the corresponding data in a GUI or causing the corresponding data to be rendered in a GUI.

Also, in some implementations block 710 includes sub-block 710A, in which the system selects block(s) of data to initially enable access to, to initially cause to be rendered in a GUI, or to initially render in a GUI. In some of those implementations, the selection of sub-block 710A is based on the UPI(s) and/or image(s) optionally included in the transmission of block 702 (e.g., blocks of data corresponding to the UPI(s) can be selected) and/or is based on temporal data of block(s) of data (e.g., the most recent N blocks of data can be selected, or the blocks of data for the last day or since a last log-in by the recipient can be selected).

At block 712, the system causes new block(s) of data, that each include a corresponding UPI and access data related to access of other block(s) having the corresponding UPI by the recipient, to be added to the child recipient blockchain linked to the recipient node. For example, for each of the blocks of data whose corresponding data was rendered to and viewed by the recipient (e.g., viewed at all or viewed for at least a threshold period of time), a corresponding new block of data can be generated that includes the UPI of the block and access data that indicates details of the access. Such details can include a time of access, a duration of access, a location of access (e.g., inferred based on IP address and/or determined based on GPS), a device identifier of the recipient device utilized in the access, and/or other detail(s).

In some implementations, block 712 includes sub-block 712A. At sub-block 712A, the system causes smart contract (s), of child recipient blockchain(s) to be executed based on the access data of the new block(s) that were caused to be added at block 712. Put another way, a smart contract can have a condition that is based on the access data, and can be executed in response to certain access data being included in a new block of data added at block 712. For example, the smart contract can be one described with respect to block 318 of method 300 of FIG. 3, and generated at block 318 of method 300.

Figure 8:
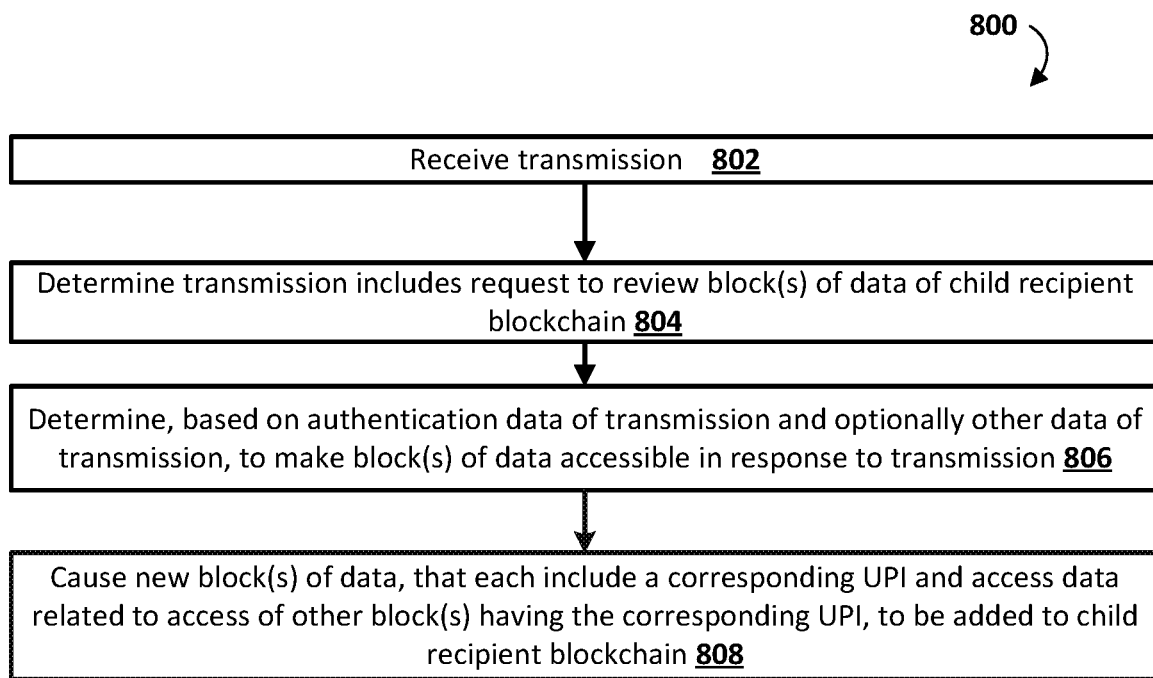
FIG. 8 is a flowchart illustrating an example method of enabling, in response to a transmission, access to block(s) of data of and/or adding new block(s) of data in response to access of the block(s).

FIG. 8 is a flowchart illustrating an example method 800 of enabling, in response to a transmission, access to block(s) of data of and/or adding new block(s) of data in response to access of the block(s). For convenience, the operations of the flow chart are described with reference to a system that performs the operations. This system may include various components of various computer systems, such as one or more components of intermediary system 140 of FIG. 1. Moreover, while operations of method 800 are shown in a particular order, this is not meant to be limiting. One or more operations may be reordered, omitted or added.

At block 802, the system receives a transmission.

At block 804, the system determines the transmission includes a request to review block(s) of data of a child recipient blockchain.

At block 806, the system determines, based on authentication data of the transmission of block 802, and optionally other data of the transmission, to make the block(s) of data accessible in response to transmission. For example, the system can determine that, in view of the authentication data, access to some or all blocks of the child recipient blockchain is permitted and, in response, make the block(s) of data accessible. In some implementations, the system can make a subset of such blocks accessible based on other data of the transmission. For example, the other data can include certain UPI(s) or certain image(s) or structured data corresponding to certain parcel(s) (based on which UPI(s) can be determined). In such an example, the system can select the subset of blocks based on those blocks of the subset each having (e.g., in a header) a corresponding one of the UPIs.

At block 808, the system causes new block(s) of data, that each include a corresponding UPI and access data related to access of other block(s) having the corresponding UPI, to be added to the child recipient blockchain. For example, for each of the blocks of data whose corresponding data was accessed (e.g., retrieved by, rendered to, and/or viewed by the recipient), a corresponding new block of data can be generated that includes the UPI of the block and access data that indicates details of the access.

Figure 9:
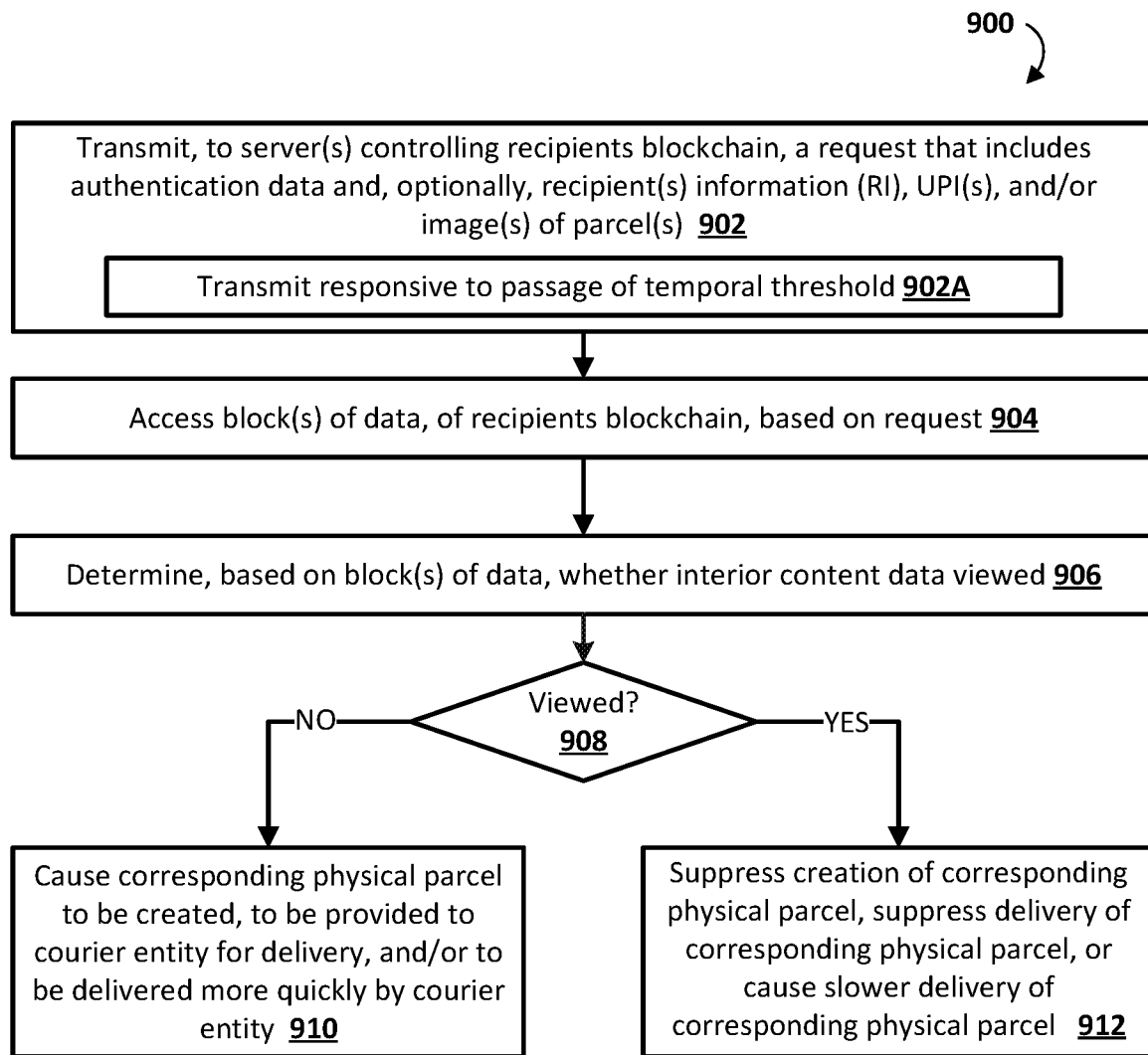
FIG. 9 is a flowchart illustrating an example method of adapting processing of a corresponding parcel in dependence on whether interior content data, of the corresponding parcel, was viewed by a recipient.

FIG. 9 is a flowchart illustrating an example method 900 of adapting processing of a corresponding parcel in dependence on whether interior content data, of the corresponding parcel, was viewed by a recipient. For convenience, the operations of the flow chart are described with reference to a system that performs the operations. This system may include various components of various computer systems, such as one or more components of sender system 120 of FIG. 1. Moreover, while operations of method 900 are shown in a particular order, this is not meant to be limiting. One or more operations may be reordered, omitted or added.

At block 902, the system transmits, to server(s) controlling a recipients blockchain, a request that includes authentication data and, optionally, recipient(s) information, UPI(s), and/or image(s) of parcel(s). In some implementations, block 902 includes sub-block 902A in which the system transmits the request responsive to passage of a temporal threshold, such as a temporal threshold following instance(s) of the interior content data becoming accessible to recipient(s) via the blockchain. In other implementations, the request of block 902 can be transmitted responsive to additional or alternative considerations, such as being transmitted at regular or non-regular intervals and/or at a certain time before a mail generation system is scheduled to create physical parcels corresponding to the block(s) of data.

At block 904, the system accesses block(s) of data, of a recipients blockchain, based on the request of block 902. The system can access the block(s) by retrieving them and/or by receiving them in response to the request. As one example, the server(s) can enable access to any block(s) of data that include access restriction data that enables access according to the authentication data of the request. As another example, the server(s) can enable access to one or more block(s) of data that include the optional UPI(s) of the request of block 902 (or the UPI(s) derived from the image(s) of block 902) and whose access restriction data enables access according to the authentication data of the request. For example, the block(s) can include any such block(s) that include recipient access data. Optionally, the blocks can further be identified based on being of child blockchain(s) of parent recipient node(s) that match the recipient(s) information included in the request of block 902.

At block 906, the system determines, based on the block(s) of data and for each of the blocks of data, whether interior content data was viewed by a recipient corresponding to the RI. For example, if there is a block that includes a UPI and that includes recipient access data, the system can determine the interior content data, corresponding to the UPI, was viewed.

At block 908, for each of the instances of interior content data, the system determines whether the decision of block 906 was that it was viewed. If so, the system proceeds to block 912 for the interior content data. If not, the system proceeds to block 910 for the interior content data.

At block 910, the system causes a corresponding physical parcel to be created, to be provided to a courier entity for delivery, and/or to be delivered more quickly by the courier entity.

At block 912, the system suppresses creation of a corresponding physical parcel, suppresses delivery of the corresponding physical parcel, or causes slower delivery of corresponding physical parcel.

Figure 10:
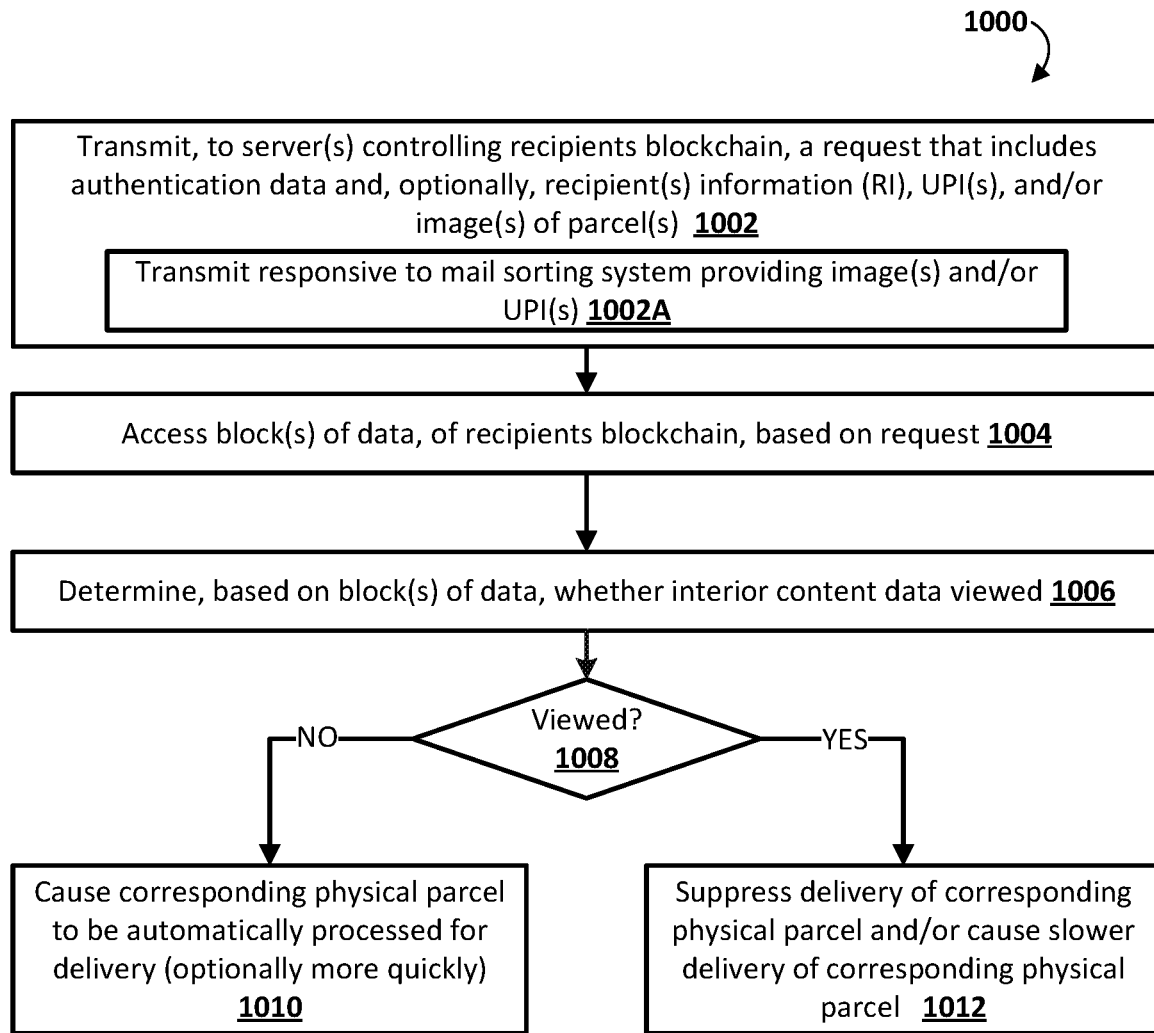
FIG. 10 is a flowchart illustrating an example method of adapting delivery of a corresponding physical parcel in dependence on whether interior content data, of the corresponding parcel, was viewed by a recipient.

FIG. 10 is a flowchart illustrating an example method 1000 of adapting delivery of a corresponding physical parcel in dependence on whether interior content data, of the corresponding parcel, was viewed by a recipient. For convenience, the operations of the flow chart are described with reference to a system that performs the operations. This system may include various components of various computer systems, such as one or more components of courier system 160 of FIG. 1. Moreover, while operations of method 1000 are shown in a particular order, this is not meant to be limiting. One or more operations may be reordered, omitted or added.

At block 1002, the system transmits, to server(s) controlling a recipients blockchain, a request that includes authentication data and, optionally, recipient(s) information, UPI(s), and/or image(s) of parcel(s). In some implementations, block 1002 includes sub-block 1002A in which the system transmits the request responsive to a mail sorting system providing image(s) of the parcel(s) and/or the UPI(s) (determined based on image(s) of the parcel(s)). For example, a request for a parcel can be transmitted responsive to a mail sorting system initially receiving the parcel, and before the parcel is at a subsequent stage of processing (that can be influenced by the decision of block 1008). In other implementations, the request of block 1002 can be transmitted responsive to additional or alternative considerations, such as being transmitted at regular or non-regular intervals and/or at a certain time before a mail sorting system is scheduled to perform certain processing of parcels.

At block 1004, the system accesses block(s) of data, of recipients blockchain, based on the request of block 1002. The system can access the block(s) by retrieving them and/or by receiving them in response to the request. As one example, the server(s) can enable access to any block(s) of data that include access restriction data that enables access according to the authentication data of the request. As another example, the server(s) can enable access to one or more block(s) of data that include the optional UPI(s) of the request of block 1002 (or the UPI(s) derived from the image(s) of block 1002) and whose access restriction data enables access according to the authentication data of the request. For example, the block(s) can include any such block(s) that include recipient access data. Optionally, the blocks can further be identified based on being of child blockchain(s) of parent recipient node(s) that match the recipient(s) information included in the request of block 1002.

At block 1006, the system determines, based on the block(s) of data and for each of the blocks of data, whether interior content data was viewed by a recipient corresponding to the RI. For example, if there is a block that includes a UPI and that includes recipient access data, the system can determine the interior content data, corresponding to the UPI, was viewed.

At block 1010, for each of the instances of interior content data, the system determines whether the decision of block 1006 was that it was viewed. If so, the system proceeds to block 1012 for the interior content data. If not, the system proceeds to block 1010 for the interior content data.

At block 1010, the system causes a corresponding physical parcel to be automatically processed for delivery and, optionally, to be processed and/or delivered more quickly.

At block 1012, the system suppresses delivery of a corresponding physical parcel and/or causes slower delivery of the corresponding physical parcel.

Figure 11:
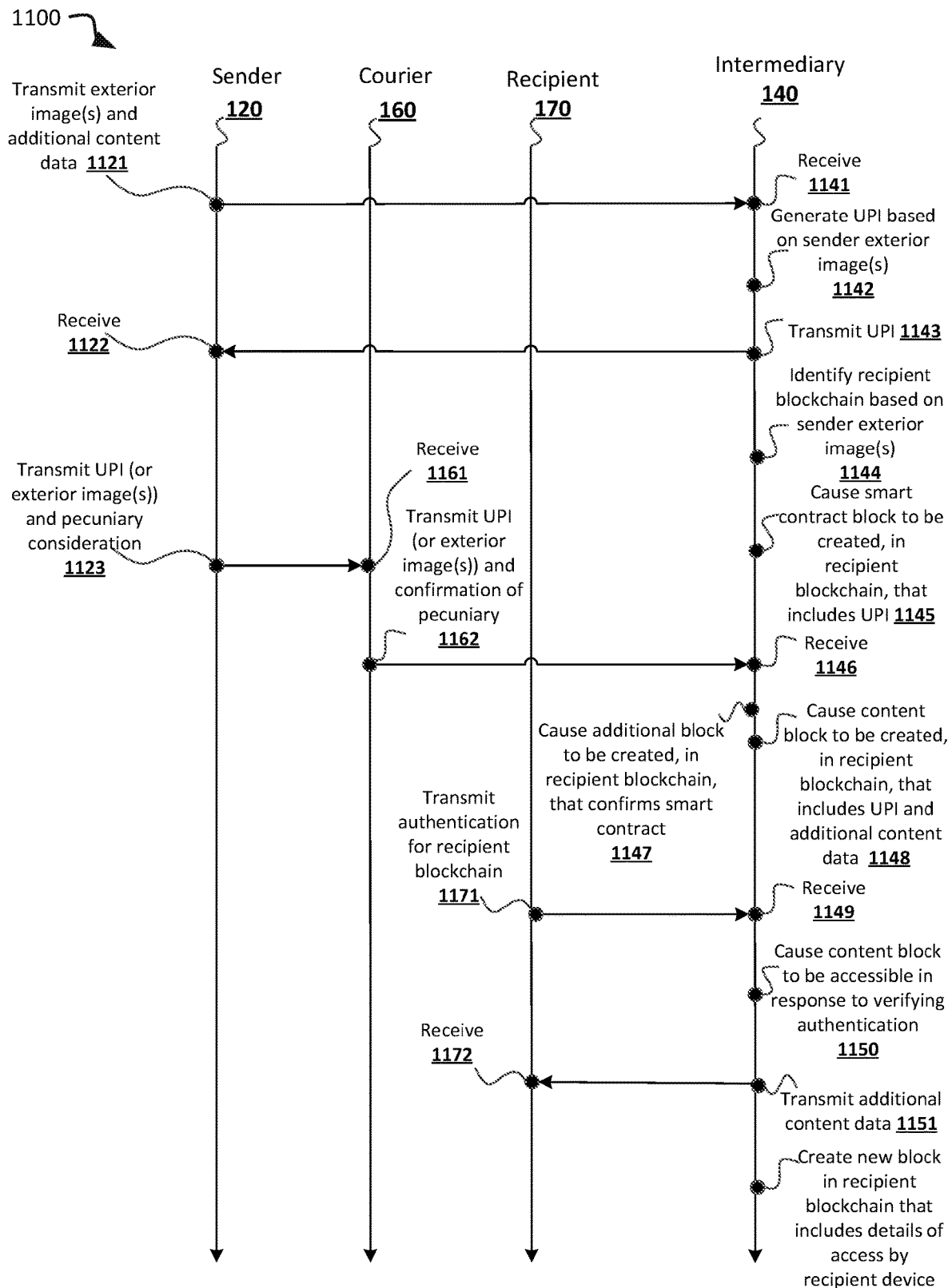
FIG. 11 illustrates an example of interactions that can occur between various components of FIG. 1.

FIG. 11 illustrates a non-limiting example of interactions that can occur between various components of FIG. 1. In FIG. 11, the sender system, at 1121, transmits exterior image(s) of a parcel and additional content data for the parcel. At 1141, the intermediary system 140 receives the transmission and, at block 1142, the intermediary system 140 generates a UPI based on the sender exterior image(s) of the transmission. At 1143, the intermediary system 140 transmits the UPI 1143 to the sender system 120, which receives the UPI at 1122. At 1144, the intermediary system 140 identifies a recipient blockchain based on the sender exterior image(s) (e.g., using RI determined based on the sender exterior image(s)). At 1145, the intermediary system 140 causes a smart contract block to be created in the recipient blockchain, where the smart contract block includes (e.g., in a header) the UPI generated at 1142.

At 1123 the sender system 120 transmits the UPI (or exterior image(s) of the parcel) and pecuniary consideration to the courier system 160. The courier system 160 receives the transmission of 1123 at 1161 and, in response, transmits, to the intermediary system 140, the UPI (or the exterior image(s) and a confirmation of the pecuniary consideration. In other implementations, the pecuniary consideration can be provided via interaction(s) with a smart contract of the blockchain, via intermediary system 140, and without requiring any direct transmission(s) between the sender system 120 and the courier system 160.

At 1146 the intermediary system 140 receives the transmission of 1162. In response, the intermediary system 140 causes an additional block to be created in the recipient blockchain, that causes the smart contract of 1145 to be confirmed (e.g., a condition of the contract was creation of the additional block). For example, the additional block can include the UPI (included in the transmission of 1162 or derived from the exterior image(s) included in the transmission of 1162) and an indication of the confirmation of the pecuniary consideration.

At 1148, in response to execution of the smart contract, the intermediary system 140 causes a content block to be created, in the recipient blockchain, that includes the UPI and the additional content data. Put another way, execution of the smart contract causes performance of 1148.

At 1171, recipient device 170 transmits, to intermediary system 140, authentication for access to a recipient blockchain for the recipient. At 1149, the intermediary system 140 receives the transmission of 1171 and, in response to the transmission and verifying the authentication, causes the content block (created at 1148) to be accessible to the recipient device 170. At 1151, the intermediary system 140 transmits, to the recipient device 1170, the additional content data of the content block created at 1148. In response to the transmitting at 1151, the intermediary system 140, at 1152, creates a new block in the recipient blockchain, where the new block includes details of the access by the recipient device.

FIG. 12A illustrates an example GUI 1290A that can be visually rendered on a client device, such as recipient device 170 of FIG. 1. The GUI 1290A can be rendered, for example, within a web browser and as part of a website that enables recipients to log-in to a respective account and access various aspects of parcels delivered and/or to be delivered to them. The GUI 1290A can additionally or alternatively be rendered within a stand-alone app e that enables recipients to log-in to a respective account and access various aspects of parcels delivered and/or to be delivered to them. Such a website or application can be implemented by an intermediary system and/or a courier system.

In FIG. 12A, the GUI 1290A includes an exterior image 1292A1 of an exterior the example parcel 202 of FIG. 2. The image 1292A1 can be a sender image (of a generated physical parcel or of a virtual parcel) or a courier image. The exterior image 1292A1 can be retrieved for rendering based on being stored in association with RI verified to match an account that is being utilized to access the GUI 1290A and that has been authenticated (e.g., by the intermediary system and/or the courier system). For example, the exterior image 1292A1 can be retrieved from a block of data of a child blockchain that is linked with the RI and can be retrieved based on the exterior image 1292A1 having not yet been viewed by the recipient (e.g., no corresponding entries in the child blockchain indicate prior access by the recipient) and/or based on the parcel associated with the exterior image 1292A1 having been recently added to the child blockchain (e.g., block(s) of data with a corresponding UPI added within the last X hours or days).

The GUI 1290A of FIG. 12A also includes status data information 1292A2 that reflects which courier entity received the physical parcel corresponding to the exterior image 1292A1 and the date and time it was received, and reflects the date the physical parcel is slated for delivery. The status data information 1292A2 can be retrieved for rendering along with the exterior image 1292A1, based on being stored in association with the same UPI as the exterior image 1292A1. For example, the status data information 1292A2 can be retrieved from blocks of data (e.g., the date and time it was received from a first block and the date it is slated for delivery from a second block) of the child blockchain and can be rendered along with the exterior image 1292A1 based on the blocks of data including the same UPI as the block that includes the exterior image 1292A1.

The GUI 1290A of FIG. 12A also includes a reproduction interior contents data link 1292A3 and a metadata interior contents data link 1292A4. The reproduction data interior contents data link 1292A3 indicates reproduction interior content data of the parcel is viewable and, when selected, can cause rendering of the reproduction data (e.g., as a pop-up, within the page/screen represented by GUI 1290A, or in a separate page/screen). The metadata interior contents data link 1292A4 indicates metadata interior contents data of the parcel is viewable and, when selected, can cause rendering of the metadata. The reproduction interior contents data link 1292A3 can be rendered along with the exterior image 1292A1, based on there being reproduction data stored in association with the same UPI as the exterior image 1292A1. Likewise, the metadata interior contents data link 1292A4 can be rendered along with the exterior image 1292A1, based on there being metadata stored in association with the same UPI as the exterior image 1292A1. For example, the reproduction data and the metadata can be stored in a block of data of the child blockchain.

FIG. 12B illustrates another example GUI 1290B that can be visually rendered on a client device, such as recipient device 170 of FIG. 1. The GUI 1290B can be, for example, rendered in lieu of the GUI 1290A of FIG. 12A or can instead be rendered after user selection of the reproduction data interior contents data link 1292A3.

Like GUI 1290A of FIG. 12A, the GUI 1290B includes an exterior image 1292B1 of an exterior the example parcel 202 of FIG. 2. The image 1292B1 can be a sender image (of a generated physical parcel or of a virtual parcel) or a courier image. The exterior image 1292B1 can be retrieved for rendering based on being stored in association with RI verified to match an account that is being utilized to access the GUI 1290B and that has been authenticated (e.g., by the intermediary system and/or the courier system).

The GUI 1290B of FIG. 12B also includes a rendered reproduction 1292B2 of at least some of the interior contents of the parcel 202. The rendered reproduction 1292B2 can be retrieved for rendering along with the exterior image 1292B1, based on being stored in association with the same UPI as the exterior image 1292B1.

The GUI 1290B of FIG. 12B also includes a metadata link 1292B3 and a forgo delivery link 1292B4. The metadata link 1292B3, when selected, can cause navigation to a webpage or separate application state that enables paying of a bill that is enclosed within the parcel 202 and that is reproduced by the rendered reproduction 1292B2. The metadata link 1292B3 can be a general link or instead can be a link that is specific to the recipient (e.g., embeds a username or account number in the link). The metadata link 1292B3 can be retrieved for rendering along with the exterior image 1292B1 and/or along with the rendered reproduction 1292B2, based on being stored in association with the same UPI as the exterior image 1292B1 and the rendered reproduction 1292B.

The forgo delivery link 1292B4, when selected, can cause certain recipient access data to be stored in association with the UPI of the parcel 202. As described herein, storing such recipient access data can cause a sender system to adapt processing of a corresponding physical parcel (or forego creation of the corresponding physical parcel) and/or a courier system to adapt processing of the corresponding physical parcel. For example, selection of the forgo delivery link 1292B4 can cause a smart contract, stored in association with the UPI of the parcel to be executed in dependence on selection of the forgo delivery link 1292B4.

Although particular GUIs 1290A and 1290B are illustrated in FIGS. 12A and 12B, it is understood that additional and/or alternative GUIs can be utilized in enabling a user to view content stored according to techniques described herein and/or in enabling a user to interact with such content. Moreover, it is also understood that audible rendering of some or part of such content can be utilized in addition to or instead of visual rendering.

Figure 13:
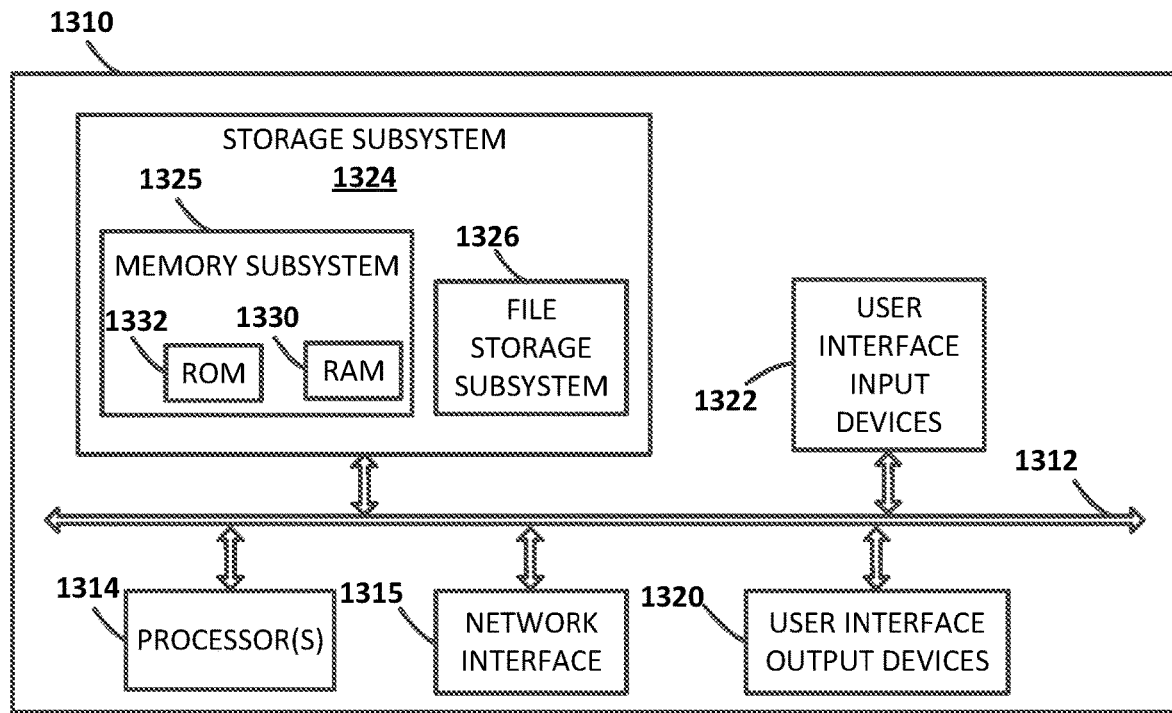
FIG. 13 illustrates an example architecture of a computing device.

FIG. 13 is a block diagram of an example computing device 1310 that may optionally be utilized to perform one or more aspects of techniques described herein. In some implementations, one or more client computing devices, server(s) and/or other component(s) described herein can comprise one or more components of the example computing device 1310.

Computing device 1310 typically includes at least one processor 1314 which communicates with a number of peripheral devices via bus subsystem 1312. These peripheral devices may include a storage subsystem 1324, including, for example, a memory subsystem 1325 and a file storage subsystem 1326, user interface output devices 1320, user interface input devices 1322, and a network interface subsystem 1316. The input and output devices allow user interaction with computing device 1310. Network interface subsystem 1316 provides an interface to outside networks and is coupled to corresponding interface devices in other computing devices.

User interface input devices 1322 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 1310 or onto a communication network.

User interface output devices 1320 may include a display subsystem, a printer, a fax machine, or non-visual displays such as audio output devices. The display subsystem may include a cathode ray tube ("CRT"), a flat-panel device such as a liquid crystal display ("LCD"), a projection device, or some other mechanism for creating a visible image. The display subsystem may also provide non-visual display such as via audio output devices. In general, use of the term "output device" is intended to include all possible types of devices and ways to output information from computing device 1310 to the user or to another machine or computing device.

Storage subsystem 1324 stores programming and data constructs that provide the functionality of some or all of the modules described herein. For example, the storage subsystem 1324 may include the logic to perform selected aspects of one or more of the methods described herein, and/or to implement various components depicted herein.

These software modules are generally executed by processor 1314 alone or in combination with other processors. Memory 1325 used in the storage subsystem 1324 can include a number of memories including a main random access memory ("RAM") 1340 for storage of instructions and data during program execution and a read only memory ("ROM") 1342 in which fixed instructions are stored. A file storage subsystem 1326 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 1326 in the storage subsystem 1324, or in other machines accessible by the processor(s) 1314.

Bus subsystem 1312 provides a mechanism for letting the various components and subsystems of computing device 1310 communicate with each other as intended. Although bus subsystem 1312 is shown schematically as a single bus, alternative implementations of the bus subsystem may use multiple busses.

Computing device 1310 can be of varying types including a workstation, server, computing cluster, blade server, server farm, or any other data processing system or computing device. Due to the ever-changing nature of computers and networks, the description of computing device 1310 depicted in FIG. 13 is intended only as a specific example for purposes of illustrating some implementations. Many other configurations of computing device 1310 are possible having more or fewer components than the computing device depicted in FIG. 13.

In some implementations, a method implemented by one or more processors is provided and includes receiving, in a transmission from an authenticated sending entity, one or more sender images and interior content data. The one or more sender images are of an exterior of a physical parcel that is to be physically delivered to a recipient by a courier entity. The interior content data that is generated based on interior contents, of the physical parcel, that are not externally visible on the physical parcel. The method further includes performing further steps based on receiving the transmission from the authenticated sending entity. Those further steps include generating, based on processing the one or more sender images, a unique parcel identifier of the physical parcel, and recipient information that uniquely identifies the recipient. Those further steps also include identifying a particular recipient node, of a parent blockchain that includes multiple recipient nodes. Identifying the particular recipient node is in response to the particular recipient node matching the recipient information generated based on processing the one or more sender images. Those steps further include identifying, using the recipient node, a particular recipient blockchain that is linked to the recipient node of the parent block chain. Those steps further include causing a new block of data, that includes the unique parcel identifier of the physical parcel, the interior content data, and new block access restriction data, to be added to the child recipient blockchain. The new block access restriction data enables access to the new block of data in response to a request that is authenticated to be from the recipient.

These and other implementations of the technology can include one or more of the following features.

In some implementations, the method further includes, subsequent to the new block of data being added to the child recipient blockchain, receiving, in a transmission from the courier entity, one or more courier images of the exterior of the physical parcel, and temporal data. The temporal data indicates a date and/or time of certain handling of the physical parcel by the courier entity. The method further includes, in response to receiving the transmission from the courier entity: generating, based on processing the one or more courier images, the unique parcel identifier of the physical parcel, and the recipient information that uniquely identifies the recipient. The method further includes identifying the particular recipient node, of the parent blockchain, in response to the particular recipient node matching the recipient information generated based on processing the one or more courier images. The method further includes identifying, using the recipient node, the particular recipient blockchain that is linked to the recipient node of the parent block chain. The method further includes causing an additional new block of data, that includes the unique parcel identifier of the physical parcel and the temporal data, to be added to the child recipient blockchain.

In some implementations, the method further includes, prior to the new block of data being added to the child recipient blockchain and in response to receiving the transmission from the authenticated sending entity: causing an initial new block of data, that includes the unique parcel identifier of the physical parcel and a smart contract, to be added to the child recipient blockchain. The smart contract includes, as a condition, receiving a transmission from the courier entity that indicates the unique parcel identifier and that the courier entity has accepted the physical parcel associated with the unique parcel identifier. The smart contract, when executed, causes the new block of data to be added to the child recipient block chain.

In some implementations, the method further includes, subsequent to the new block of data being added to the child recipient blockchain, determining that the new block of data was accessed in response to the request authenticated to be from the recipient. The method further includes, in response to determining that the new block of data was accessed in response to the request authenticated to be from the recipient, causing an additional new block of data, that includes the unique parcel identifier of the physical parcel and an indication of access by the recipient, to be added to the child recipient blockchain. In some of those implementations, the indication of access includes a date of the access, a time of the access, an IP address utilized in the access, and/or a location of the access.

In some implementations, generating, based on processing the one or more sender images, the unique parcel identifier, includes: performing optical character recognition (OCR) on one or more portions of the one or more sender images to generate OCR text and generating the unique parcel identifier as a function of the OCR text.

In some implementations, generating, based on processing the one or more sender images, the unique parcel identifier, includes: identifying a barcode in the one or more sender images and generating the unique parcel identifier as a function of data derived from the barcode.

In some implementations, generating, based on processing the one or more sender images, the unique parcel identifier, includes: performing optical character recognition (OCR) on one or more portions of the one or more sender images to generate OCR text; performing optical scanning on the one or more sender images to generate optical scanning data; and/or identifying, in the one or more sender images, a barcode—and generating the unique parcel identifier as a function of the OCR text, the optical scanning data, and/or data derived from the barcode. In some of those implementations, the unique parcel identifier is a particular parcel hash value and generating the unique parcel identifier comprises applying the OCR text, the optical scanning data, and/or the data derived from the barcode to a parcel hash function.

In some implementations, the physical parcel includes a postage barcode and the method further includes identifying the postage barcode based on processing the one or more sender images and validating the postage barcode. In some versions of those implementations, causing the new block of data to be added to the child recipient blockchain is contingent on validating the postage barcode. In some of those versions validating the postage barcode includes causing the postage barcode to be transmitted to the courier entity or to be stored (e.g., in eh blockchain) so that it is accessible to the courier entity, and validating the postage barcode in response to a validation confirmation provided by the courier entity in response to the transmission or in response to the courier entity accessing the stored postage barcode.

In some implementations, the recipient information is a particular recipient hash value. In some of those implementations, generating the recipient information based on processing the one or more sender images includes performing optical character recognition (OCR) on one or more address portions of the one or more sender images to generate OCR address text, and generating the particular recipient hash value based on applying the OCR address text to a recipient hash function.

In some implementations, the new block access restriction data prevents access by the courier entity to the interior content data of the new block of data.

In some implementations, the new block access restriction data enables access by the sending entity and the recipient to the interior content data of the new block of data.

In some implementations, the interior content data is represented, in the new block of data, as a non-fungible token (NFT).

In some implementations, the recipient is a particular address, a particular address and a particular surname, a particular address and any one of multiple particular names, or a particular address and a single particular name.

In some implementations, generating the unique parcel identifier is a function of content and/or positions of one or more of a recipient address, a return address, a barcode, an image scan, a postal identification id, a mailing date, and/or a mailing time. In some implementations, generating the unique parcel identifier is a function of content and/or positions of two or more of a recipient address, a return address, a barcode, an image scan, a postal identification id, a mailing date, and/or a mailing time.

In some implementations, the interior content data includes reproduction data. In some of those implementations, the reproduction data includes one or more images of the interior contents, optical character recognition (OCR) data that is based on the one or more images, a portable document format version of the interior contents, and/or a structured representation of the interior content.

In some implementations, the interior content data includes metadata that is based on, but not included in the interior contents of a physical parcel. In some of those implementations, the metadata includes a link to an Internet resource.

In some implementations, the physical parcel is an envelope containing the interior contents, is a box containing the interior contents, or is an irregular shape container containing the interior contents.

In some implementations, the method further includes receiving, in an additional transmission from the authenticated sending entity, one or more additional sender images and additional interior content data. The additional sender images are of an additional exterior of an additional physical parcel that is to be physically delivered to an additional recipient by the courier entity. The additional interior content data that is generated based on additional interior contents, of the additional physical parcel, that are not externally visible on the additional physical parcel. The method further includes, based on receiving the additional transmission from the authenticated sending entity: generating, based on processing the one or more sender images, additional recipient information that uniquely identifies the additional recipient; determining that none of the multiple recipient nodes of the parent blockchain match the additional recipient information generated based on processing the one or more additional sender images; and, in response to determining that none of the multiple recipient nodes of the parent blockchain match the additional recipient information, transmitting, to the authenticated sending entity, an indication that the additional recipient information is invalid.

In some implementations, the method further includes receiving, in an additional transmission from the authenticated sending entity, one or more additional sender images and additional interior content data. The additional sender images are of an additional exterior of an additional physical parcel that is to be physically delivered to an additional recipient by the courier entity. The additional interior content data that is generated based on additional interior contents, of the additional physical parcel, that are not externally visible on the additional physical parcel. The method further includes, based on receiving the additional transmission from the authenticated sending entity: generating, based on processing the one or more sender images, additional recipient information that uniquely identifies the additional recipient; identifying a particular additional recipient node, of the parent blockchain, where identifying the particular additional recipient node is in response to the particular additional recipient node matching the additional recipient information generated based on processing the one or more additional sender images; identifying, using the additional recipient node, a particular additional recipient blockchain that is linked to the recipient node of the parent blockchain; determining that the particular additional recipient blockchain includes a block indicating that the additional recipient is no longer a valid recipient; and in response to determining that the particular additional recipient blockchain includes the block indicating that the additional recipient is no longer a valid recipient, transmitting, to the authenticated sending entity, an indication that the additional recipient information is invalid.

In some implementations, a method implemented by one or more processors is provided and includes receiving, in one or more transmissions provided via one or more networks, a unique parcel identifier, recipient information, and interior content data. The unique parcel identifier is of a physical parcel that is to be physically delivered to a recipient by a courier entity and is generated based on one or more externally visible features of the physical parcel. The recipient information uniquely identifies the recipient. The interior content data that is generated based on interior contents, of the physical parcel, that are not externally visible on the physical parcel. The method further includes, based on receiving the unique parcel identifier and the recipient information, causing the interior content data to be stored, in one or more network accessible databases, in association with the unique parcel identifier and in association with access restriction data. The access restriction data enables access to the interior content data in response to a request authenticated to be from the recipient.

These and other implementations of the technology can include one or more of the following features.

In some implementations, causing the interior content data to be stored, in the one or more network accessible databases, in association with the unique parcel identifier and in association with the access restriction data, includes: causing a new block of data, that includes the interior content data, the unique parcel identifier, and the access restriction data, to be created in a blockchain.

In some implementations, the interior content data is represented, in the new block of data, as a non-fungible token (NFT).

In some implementations, the blockchain is a child blockchain that includes only blocks specific to the recipient. In some of those implementations, the method further includes identifying, based on the recipient information, a node, of a parent blockchain, that matches the recipient information. In those implementations, causing the new block of data, that includes the encrypted interior content data, to be created in the blockchain includes causing the new block of data to be created in the child blockchain based on the child blockchain being linked with the identified node. In some versions of those implementations, causing the new block of data to be created in the child blockchain based on the child blockchain being linked with the identified node comprises submitting a request, to a blockchain cross chain bridge, that identifies the child blockchain and the unique parcel identifier, and that includes the interior content data. In some additional or alternative versions of those implementations, the method further includes receiving, in an additional transmission provided by the courier entity: the unique parcel identifier, and a confirmation that the physical parcel is out for delivery to the recipient; and, in response to receiving the additional transmission, causing a further new block of data to be created, in the child blockchain, that includes the unique parcel identifier and confirmation data that reflects the physical parcel is out for delivery. In some additional or alternative versions of those implementations, the method further includes receiving, in an additional transmission, the unique parcel identifier, and an indication that the interior content data, of the block of data, was accessed in response to a particular request from the recipient; and, in response to receiving the additional transmission, causing a further new block of data to be created, in the child blockchain, that includes the unique parcel identifier and request data that reflects one or more attributes of the request.

In some implementations, the recipient is a particular address, a particular address and a particular surname, a particular address and any one of multiple particular names, or a particular address and a single particular name.

In some implementations, the recipient information is a generated hash of the recipient.

In some implementations, the access restriction data enables access to the interior content data in response to requests that are associated with a verified login of an account of the recipient. In some of those implementations, the account of the recipient is generated in response to an enrollment procedure in which the recipient is verified based on one or more factors. Such factor(s) can include verifying that government issued credentials correspond to the recipient information and/or verifying that an IP address, utilized by a client device during the enrollment procedure, corresponds to the recipient information.

In some implementations, the one or more transmission are from an additional entity that is distinct from the courier entity. In some of those implementations, the method further includes receiving, in an additional transmission provided by the courier entity, the unique parcel identifier, and a confirmation that the physical parcel is out for delivery to the recipient. In some versions of those implementations, causing the interior content data to be stored, in the one or more network accessible databases, in association with the unique parcel identifier, is in response to: receiving the additional transmission from the courier entity and determining that the unique parcel identifier, of the additional transmission, matches the unique parcel identifier of the transmission and that the additional transmission includes the confirmation that the physical parcel is out for delivery to the recipient.

In some implementations, a method implemented by one or more processors is provided and includes receiving, in a transmission from an authenticated sending entity, one or more sender images and interior content data. The one or more sender images are of an exterior of a physical parcel that is to be physically delivered to a recipient by a courier entity. The interior content data is generated based on interior contents, of the physical parcel, that are not externally visible on the physical parcel. The method further includes, based on receiving the transmission from the authenticated sending entity: generating, based on processing the one or more sender images, a unique parcel identifier of the physical parcel, and recipient information that uniquely identifies the recipient; and causing the interior content data to be stored, in one or more network accessible databases, in association with the unique parcel identifier and in association with access restriction data. The access restriction data enables access to the interior content data in response to a request authenticated to be from the recipient.

These and other implementations of the technology can include one or more of the following features.

In some implementations, causing the interior content data to be stored, in the one or more network accessible databases, in association with the unique parcel identifier and in association with the access restriction data, includes: causing a new block of data, that includes the interior content data, the unique parcel identifier, and the access restriction data, to be created in a blockchain.

In some implementations, a method implemented by one or more processors is provided and includes receiving, in a transmission from a sending entity, one or more sender images of a virtual parcel that corresponds to a yet to be generated physical parcel addressed to a recipient; and interior content data that is generated based on interior contents, of the physical parcel, that are not externally visible on the physical parcel. The method further includes generating, based on processing the one or more sender images: a unique parcel identifier of the virtual parcel, and recipient information that uniquely identifies the recipient. The method further includes, prior to the sending entity creating a physical parcel that matches the virtual parcel, and in response to receiving the transmission: identifying, based on the recipient information, a child blockchain for the recipient; and causing a block of data, that includes the interior content data and the unique parcel identifier, to be created in the child blockchain. The interior content data is accessible via the child blockchain in response to a request that is authenticated to be from the recipient.

These and other implementations of the technology can include one or more of the following features.

In some implementations, the method further includes, in response to receiving the transmission, causing an additional block of data, that includes a smart contract between the sending entity and a courier entity, to be included in the child blockchain. In some versions of those implementations, the smart contract is executed automatically at a certain time and the executed smart contract terms are dependent on whether the recipient accesses the interior content data of the block of data prior to the certain time. In some of those versions: when the recipient accesses the interior content data of the block of data prior to the certain time, the executed smart contract terms require a first pecuniary consideration from the sending entity and do not require delivery, by the courier entity, of the yet to be generated physical parcel; and/or when the recipient does not access the interior content data of the block of data prior to the certain time, the executed smart contract terms require a second pecuniary consideration from the sending entity and do require delivery, by the courier entity, of the yet to be generated physical parcel, the second pecuniary consideration being greater than the first pecuniary consideration.

In some implementations, a method implemented by one or more processors is provided and includes transmitting, to one or more servers controlling a recipients blockchain, a request that includes one or more sender images and interior content data. The one or more sender images are of a virtual parcel that corresponds to a yet to be generated physical parcel addressed to a recipient. The interior content data is generated based on interior contents to be included in the physical parcel, but not externally visible on the physical parcel. Transmitting the request causes the one or more servers to: generate, based on the one or more sender images, a unique parcel identifier of the virtual parcel; and cause a block of data, that includes the unique parcel identifier and the interior content data, to be stored in a child blockchain for the recipient. The method further includes, prior to creating a physical parcel that matches the virtual parcel: using the unique parcel identifier to determine whether an additional block of data, that indicates access of the interior content data by the recipient, has been added to the child blockchain; and in response to determining that an additional block of data, that indicates access of the interior content data by the recipient, has been added to the child blockchain, suppressing creation of the physical parcel.

These and other implementations of the technology can include one or more of the following features.

In some implementations, the method further includes, in response to determining that an additional block of data, that indicates access of the interior content data by the recipient, has not been added to the child blockchain, causing the physical parcel to be created and provided to a courier entity for delivery. In some of those implementations, causing the physical parcel to be created and provided to a courier entity for delivery includes transmitting data, that corresponds to the virtual parcel, to an automated mail generation system.

In some implementations, suppressing creation of the physical parcel comprises removing data, that corresponds to the virtual parcel, from a set of data queued for providing to an automated mail generation system.

In some implementations, the method further includes, prior to creating the physical parcel, determining that the additional block of data, or a further additional block of data that has been added to the child blockchain, indicates affirmation by the recipient to forego physical delivery. In some of those implementations, suppressing creation of the physical parcel is further in response to determining that the additional block of data, or the further additional block of data, indicates affirmation by the recipient to forego physical delivery.

In some implementations, the interior content data includes reproduction data and/or includes a link to an Internet resource, where the link is not included in the interior contents of the physical parcel.

In some implementations, a method implemented by one or more processors is provided and includes receiving, in a transmission from an authenticated courier entity: one or images of an exterior of a physical parcel that is to be physically delivered to a recipient by the courier entity; and status data that reflects a status of the physical parcel. The method further includes, based on receiving the transmission from the authenticated courier entity, generating, based on processing the one or more sender images: a unique parcel identifier of the physical parcel; and recipient information that uniquely identifies the recipient. The method further includes identifying a particular recipient node, of a parent blockchain including multiple recipient nodes; identifying, using the recipient node, a particular recipient blockchain that is linked to the recipient node of the parent block chain; and causing a new block of data, that includes the unique parcel identifier of the physical parcel, the status data, and new block access restriction data, to be added to the child recipient blockchain. Identifying the particular recipient node is in response to the particular recipient node matching the recipient information generated based on processing the one or more sender images. The new block access restriction data enables access to the new block of data in response to a request that is authenticated to be from the recipient.

In some implementations, a method implemented by one or more processors is provided and includes receiving one or more images, of a physical parcel that is addressed to a recipient, from a mail sorting system. The method further includes, in response to receiving the one or more images, transmitting, to one or more servers controlling a recipients blockchain, a request. The request includes a unique parcel identifier of the physical parcel or the one or more images of the physical parcel. The request also includes status data, that reflects a status of the physical parcel, as indicated by the mail sorting system. Transmitting the request causes the one or more servers to cause a new block of data to be added to a child blockchain for the recipient, where the new block of data includes the unique parcel identifier of the physical parcel and the status data.

In some implementations, a method implemented by one or more processors is provided and includes generating, based on a virtual parcel that corresponds to a yet to be generated physical parcel addressed to a recipient, a unique parcel identifier for the virtual parcel. The method further includes transmitting, to one or more servers controlling a recipients blockchain, a request. The request includes the unique parcel identifier and includes interior content data that is generated based on interior contents to be included in the physical parcel, but not externally visible on the physical parcel. Transmitting the request causes the one or more servers to cause a block of data, that includes the unique parcel identifier and the interior content data, to be stored in a child blockchain for the recipient. The method further includes, prior to creating a physical parcel that matches the virtual parcel, using the unique parcel identifier to determine whether an additional block of data, that indicates access of the interior content data by the recipient, has been added to the child blockchain. The method further includes, in response to determining that an additional block of data, that indicates access of the interior content data by the recipient, has been added to the child blockchain, suppressing creation of the physical parcel.

These and other implementations of the technology can include one or more of the following features.

In some implementations, the method further includes, in response to determining that an additional block of data, that indicates access of the interior content data by the recipient, has not been added to the child blockchain, causing the physical parcel to be created and provided to a courier entity for delivery.

In some implementations, generating, based on the virtual parcel, the unique parcel identifier, includes identifying, in the virtual parcel, a barcode and/or text and generating the unique parcel identifier as a function of the text and/or of data derived from the barcode.

In some implementations, the unique parcel identifier is a particular parcel hash value and generating the unique parcel identifier includes applying data from the virtual parcel to a parcel hash function.

In some implementations, a method implemented by one or more processors is provided and includes transmitting, to one or more servers controlling a blockchain, a request. The request includes a unique parcel identifier of a physical parcel (addressed to a recipient) or one or more images of the physical parcel. The method further includes receiving, in response to the request, data from one or more blocks of the blockchain, based on the one or more blocks including the unique parcel identifier. The method further includes determining, based on the data, whether the data reflects access of interior content data, associated with interior contents of the physical parcel, from at least one of the blocks of the child blockchain. The method further includes determining, based on whether the data reflects access of the interior content data by the recipient, one or more criteria for automatically mechanically processing the physical parcel. The method further includes causing the physical parcel to be automatically mechanically processed based on the one or more criteria.

These and other implementations of the technology can include one or more of the following features.

In some implementations, when the data reflects no access of the interior content data by the recipient, the one or more criteria cause the physical parcel to be automatically mechanically processed for delivery to the recipient.

In some implementations, when the data reflects access of the interior content data by the recipient, the one or more criteria cause the physical parcel to be automatically mechanically processed for recycling in lieu of delivery to the recipient.

In some implementations, when the data reflects no access of the interior content data by the recipient, the one or more criteria cause the physical parcel to be automatically mechanically processed for delivery to the recipient within a first timeframe; and when the data reflects no access of the interior content data by the recipient, the one or more criteria cause the physical parcel to be automatically mechanically processed for delivery to the recipient within a second timeframe that is a larger temporal timeframe than the first timeframe.

In some implementations, the method further includes receiving the one or more images, of the physical parcel, from a mail sorting system. In some of those implementations, transmitting the request is in response to receiving the one or more images.

In addition, some implementations may include a system including one or more devices, each with one or more processors and memory operably coupled with the one or more processors, where the memory(ies) of the one or more devices store instructions that, in response to execution of the instructions by the one or more processors of the one or more assistant devices, cause the one or more processors to perform any of the methods described herein. Some implementations also include at least one non-transitory computer-readable medium including instructions that, in response to execution of the instructions by one or more processors, cause the one or more processors to perform any of the methods described herein.

What is claimed is:

1. A method implemented by one or more processors, the method comprising:
    transmitting, to one or more servers controlling a recipients blockchain, a request that includes:
        one or more sender images of a virtual parcel that corresponds to a yet to be generated physical parcel addressed to a recipient, and
        interior content data that is generated based on interior contents to be included in the physical parcel, but not externally visible on the physical parcel;
        wherein transmitting the request causes the one or more servers to:
            generate, based on the one or more sender images, a unique parcel identifier of the virtual parcel, and
            cause a block of data, that includes the unique parcel identifier and the interior content data, to be stored in a child blockchain for the recipient;
    prior to creating a physical parcel that matches the virtual parcel:
        using the unique parcel identifier to determine whether an additional block of data, that indicates access of the interior content data by the recipient, has been added to the child blockchain; and
        in response to determining that an additional block of data, that indicates access of the interior content data by the recipient, has been added to the child blockchain:
            suppressing creation of the physical parcel.

2. The method of claim 1, further comprising,
in response to determining that an additional block of data, that indicates access of the interior content data by the recipient, has not been added to the child blockchain:
    causing the physical parcel to be created and provided to a courier entity for delivery.

3. The method of claim 2, wherein causing the physical parcel to be created and provided to the courier entity for delivery comprises:
    transmitting data, that corresponds to the virtual parcel, to an automated mail generation system.

4. The method of claim 1, wherein suppressing creation of the physical parcel comprises removing data, that corresponds to the virtual parcel, from a set of data queued for providing to an automated mail generation system.

5. The method of claim 1, further comprising, prior to creating the physical parcel:
    determining that the additional block of data, or a further additional block of data that has been added to the child blockchain, indicates affirmation by the recipient to forego physical delivery;
    wherein suppressing creation of the physical parcel is further in response to determining that the additional block of data, or the further additional block of data, indicates affirmation by the recipient to forego physical delivery.

6. The method of claim 1, wherein the interior content data comprises reproduction data, the reproduction data comprising one or more images of the interior contents and/or optical character recognition (OCR) data that is based on the one or more images.

7. The method of claim 1, wherein the interior content data further comprises a link to an Internet resource, the link not being included in the interior contents of the physical parcel.

8. The method of claim 1, wherein transmitting the request further causes the one or more servers to:
    generate, based on the one or more sender images, recipient information that uniquely identifies the recipient;
    wherein the one or more servers, in causing the block of data that includes the unique parcel identifier and the interior content data, to be stored in the child blockchain for the recipient are to:
        identify the child blockchain using the recipient information.

9. A method implemented by one or more processors, the method comprising:
    generating, based on a virtual parcel that corresponds to a yet to be generated physical parcel addressed to a recipient:
        a unique parcel identifier for the virtual parcel;
    transmitting, to one or more servers controlling a recipients blockchain, a request that includes:
        the unique parcel identifier, and
        interior content data that is generated based on interior contents to be included in the physical parcel, but not externally visible on the physical parcel
    wherein transmitting the request causes the one or more servers to:
        cause a block of data, that includes the unique parcel identifier and the interior content data, to be stored in a child blockchain for the recipient;
    prior to creating a physical parcel that matches the virtual parcel:
        using the unique parcel identifier to determine whether an additional block of data, that indicates access of the interior content data by the recipient, has been added to the child blockchain; and
        in response to determining that an additional block of data, that indicates access of the interior content data by the recipient, has been added to the child blockchain:
            suppressing creation of the physical parcel.

10. The method of claim 9, further comprising,
in response to determining that an additional block of data, that indicates access of the interior content data by the recipient, has not been added to the child blockchain:
    causing the physical parcel to be created and provided to a courier entity for delivery.

11. The method of claim 9, wherein generating, based on the virtual parcel, the unique parcel identifier, comprises:
    identifying, in the virtual parcel, a barcode and/or text; and
    generating the unique parcel identifier as a function of the text and/or of data derived from the barcode.

12. The method of claim 9, wherein generating, based on the virtual parcel, the unique parcel identifier, comprises:
identifying, in the virtual parcel, a barcode and text; and
generating the unique parcel identifier as a function of the text and of data derived from the barcode.

13. The method of claim 9, wherein the unique parcel identifier is a particular parcel hash value and wherein generating the unique parcel identifier comprises applying data from the virtual parcel to a parcel hash function.

14. The method of claim 9, wherein suppressing creation of the physical parcel comprises removing data, that corresponds to the virtual parcel, from a set of data queued for providing to an automated mail generation system.

15. The method of claim 9, further comprising, prior to creating the physical parcel:
determining that the additional block of data, or a further additional block of data that has been added to the child blockchain, indicates affirmation by the recipient to forego physical delivery;
wherein suppressing creation of the physical parcel is further in response to determining that the additional block of data, or the further additional block of data, indicates affirmation by the recipient to forego physical delivery.

16. The method of claim 9, wherein the interior content data comprises reproduction data, the reproduction data comprising one or more images of the interior contents and/or optical character recognition (OCR) data that is based on the one or more images.

17. The method of claim 16, wherein the interior content data further comprises a link to an Internet resource, the link not being included in the interior contents of the physical parcel.

18. The method of claim 9, wherein transmitting the request further causes the one or more servers to:
generate, based on the one or more sender images, recipient information that uniquely identifies the recipient;
wherein the one or more servers, in causing the block of data that includes the unique parcel identifier and the interior content data, to be stored in the child blockchain for the recipient are to:
identify the child blockchain using the recipient information.

19. A system, comprising:
memory storing instructions;
one or more processors, executing the instructions stored in the memory, to:
transmit, to one or more servers controlling a recipients blockchain, a request that includes:
one or more sender images of a virtual parcel that corresponds to a yet to be generated physical parcel addressed to a recipient, and
interior content data that is generated based on interior contents to be included in the physical parcel, but not externally visible on the physical parcel;
wherein transmitting the request causes the one or more servers to:
generate, based on the one or more sender images, a unique parcel identifier of the virtual parcel, and
cause a block of data, that includes the unique parcel identifier and the interior content data, to be stored in a child blockchain for the recipient;
prior to creating a physical parcel that matches the virtual parcel:
use the unique parcel identifier to determine whether an additional block of data, that indicates access of the interior content data by the recipient, has been added to the child blockchain; and
in response to determining that an additional block of data, that indicates access of the interior content data by the recipient, has been added to the child blockchain:
suppress creation of the physical parcel.

* * * * *